United States Patent
Choi et al.

(10) Patent No.: US 11,068,075 B1
(45) Date of Patent: Jul. 20, 2021

(54) READING SUPPORT SYSTEM AND METHOD BY RELATING BOOK OBJECT TO INTERACTIVE CONTENT

(71) Applicant: WOONGJIN THINKBIG CO., LTD., Paju-si (KR)

(72) Inventors: Samrak Choi, Paju-si (KR); Jeonguk Park, Paju-si (KR); Hyejung Jang, Paju-si (KR); Bonggyu Kim, Paju-si (KR); Jaiok Shin, Paju-si (KR); Hyunsun Jung, Paju-si (KR)

(73) Assignee: WOONGJIN THINKBIG CO., LTD., Paju-si (KR)

( * ) Notice: Subject to any disclaimer, the term of this patent is extended or adjusted under 35 U.S.C. 154(b) by 0 days.

(21) Appl. No.: 16/905,827

(22) Filed: Jun. 18, 2020

(30) Foreign Application Priority Data

May 19, 2020 (KR) .................. 10-2020-0059957

(51) Int. Cl.
*G06F 3/03* (2006.01)
*G09G 5/377* (2006.01)

(52) U.S. Cl.
CPC ........... *G06F 3/0304* (2013.01); *G09G 5/377* (2013.01); *G09G 2340/125* (2013.01); *G09G 2354/00* (2013.01)

(58) Field of Classification Search
CPC ......... G06F 3/0304; G06F 3/00; G09G 5/377; G09G 2340/125; G09G 2354/00; H04N 5/265
See application file for complete search history.

(56) References Cited

U.S. PATENT DOCUMENTS

2018/0005448 A1* 1/2018 Choukroun ............. G06T 5/005
2018/0053294 A1* 2/2018 Rastgar ............. G06K 9/00369

FOREIGN PATENT DOCUMENTS

KR 10-2014-0073155 A 8/2014

OTHER PUBLICATIONS

KR Office Action in Application No. 10-2020-0059957 dated Jul. 29, 2020.
YouTube, The Tube Family, Crayola Color Alive (Mar. 8, 2015) Retrieved from: https://www.youtube.com/watch?time_continue=617&v=kJmlo5N-uM0&feature=emb_logo.

* cited by examiner

*Primary Examiner* — Robert J Michaud
(74) *Attorney, Agent, or Firm* — Maschoff Brennan

(57) ABSTRACT

The present disclosure provides a reading support system and method which change a portion of an activity surface video displayed on a display corresponding to a location of an interactive object. The provided reading support system includes a reading support apparatus, and the reading support apparatus outputs interactive contents corresponding to the interactive object included in an activity surface video, detects at least a portion of the interactive contents as a deformation target area based on the location of the interactive object after the interactive contents are output, generates a deformation video reflecting video deformation information in the deformation target area of the interactive contents, and replaces the interactive contents being output with a deformation video to output the deformation video.

16 Claims, 28 Drawing Sheets

[FIG. 1]
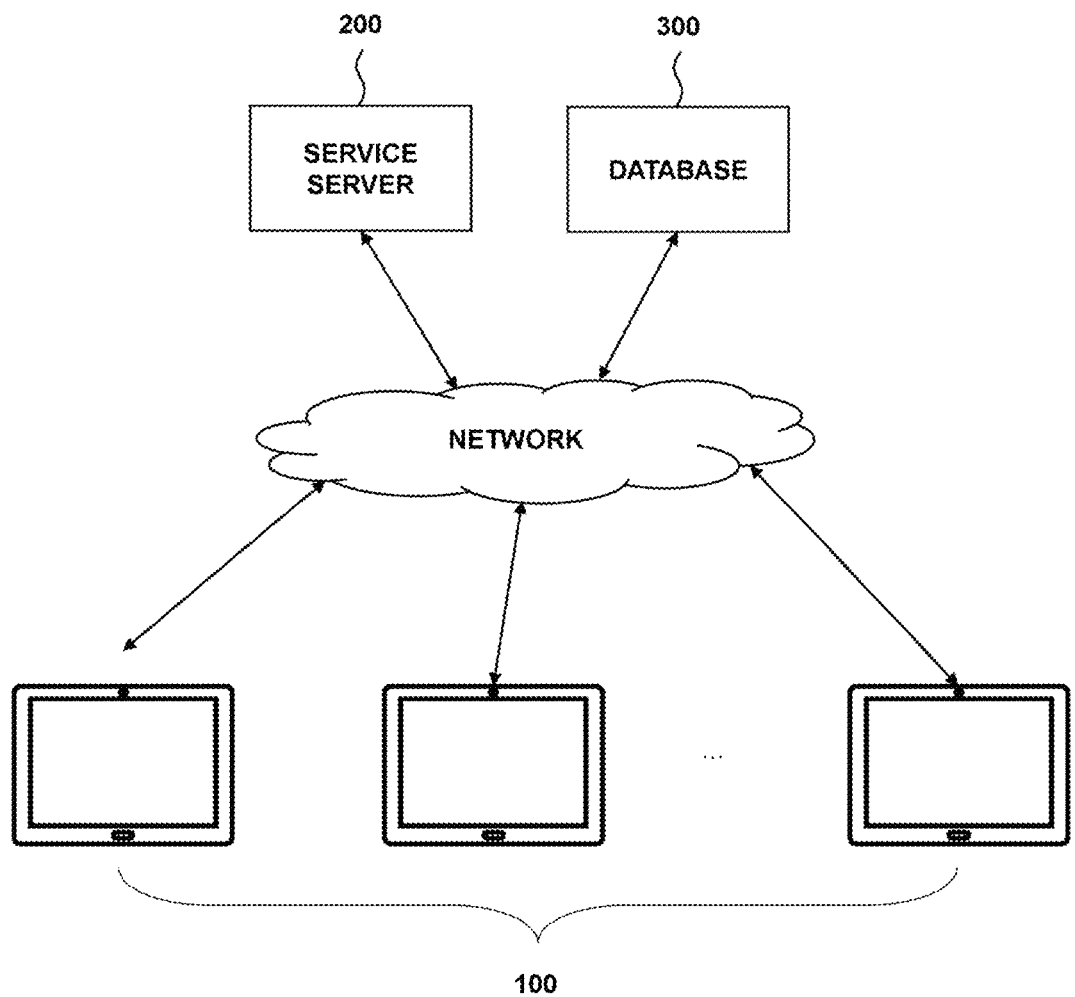

[FIG. 2]
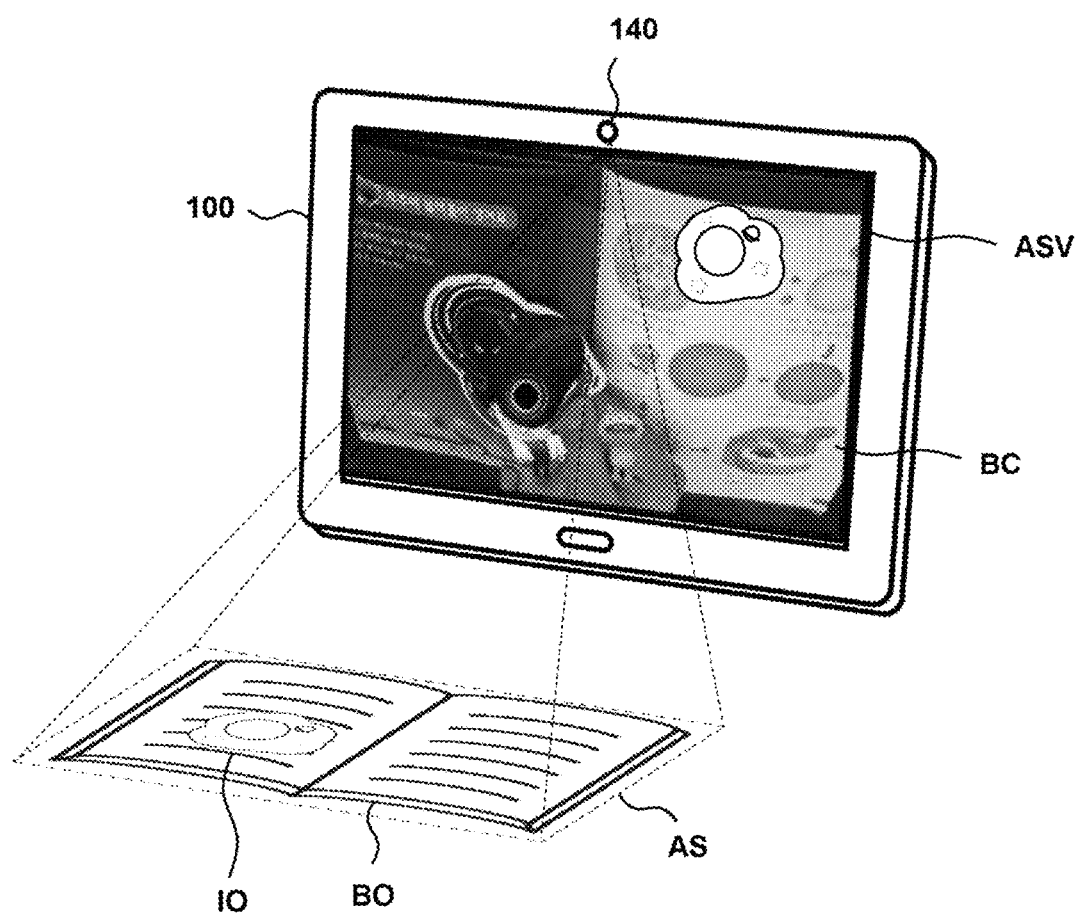

[FIG. 3]
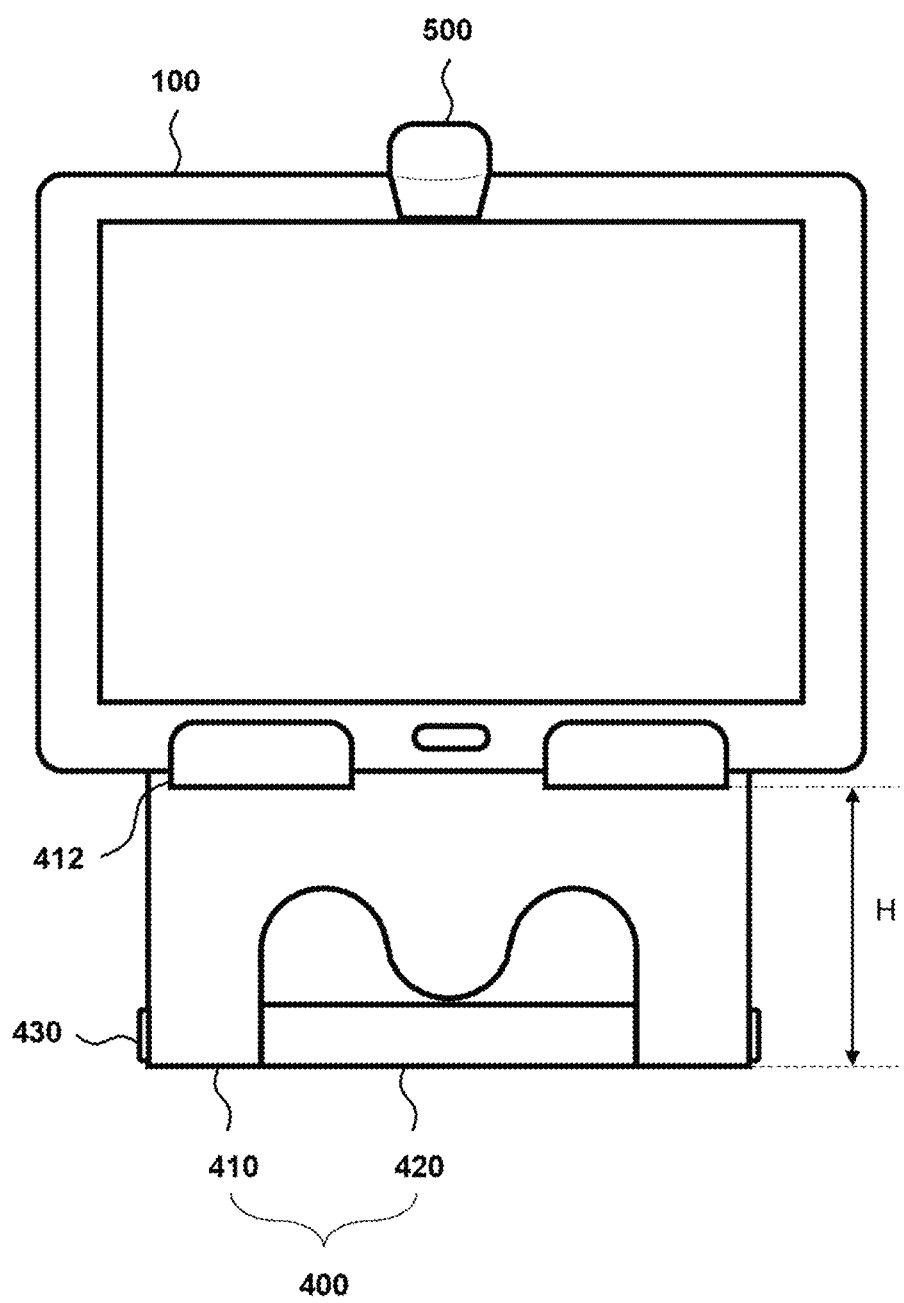

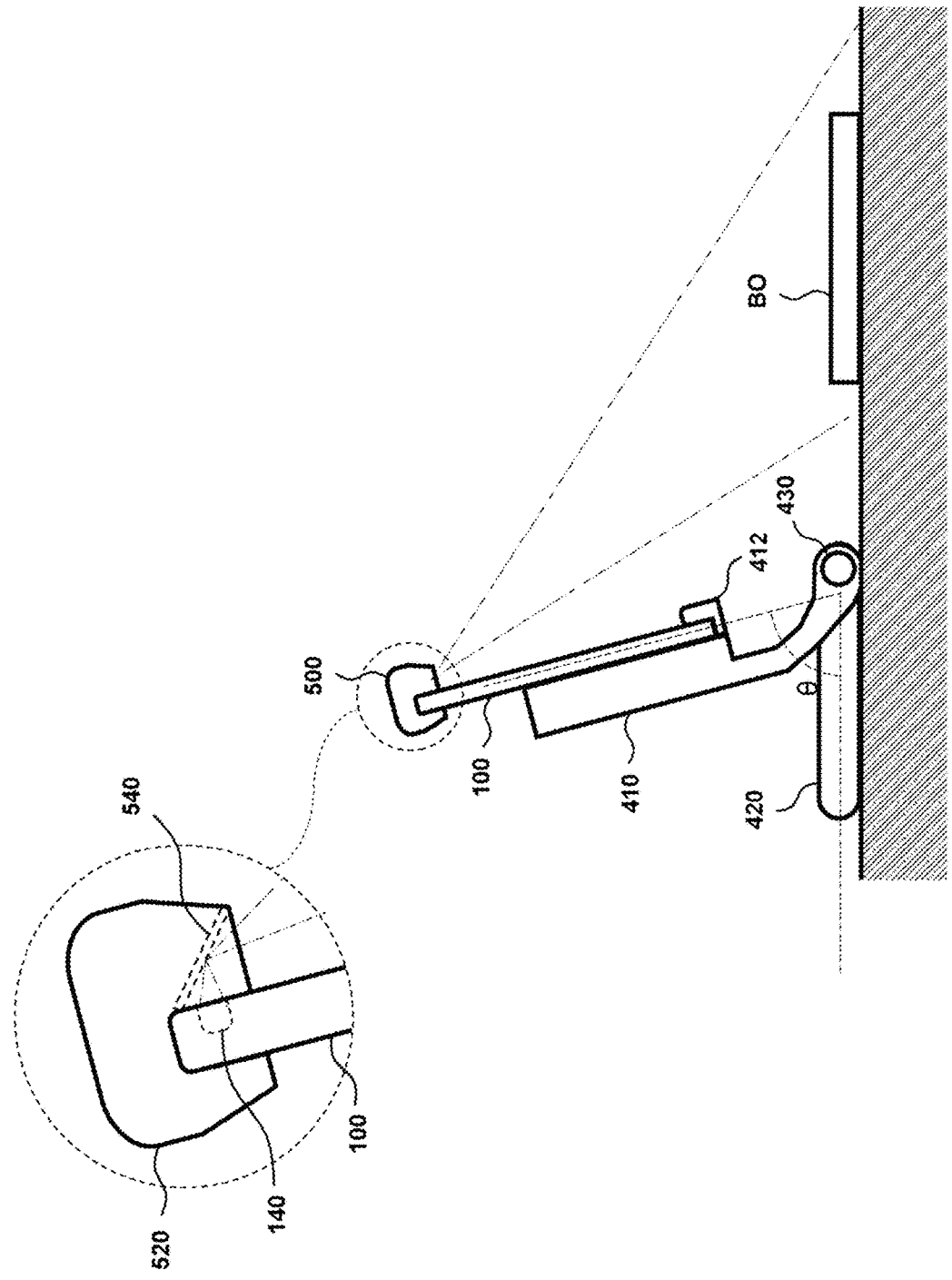
[Fig. 4]

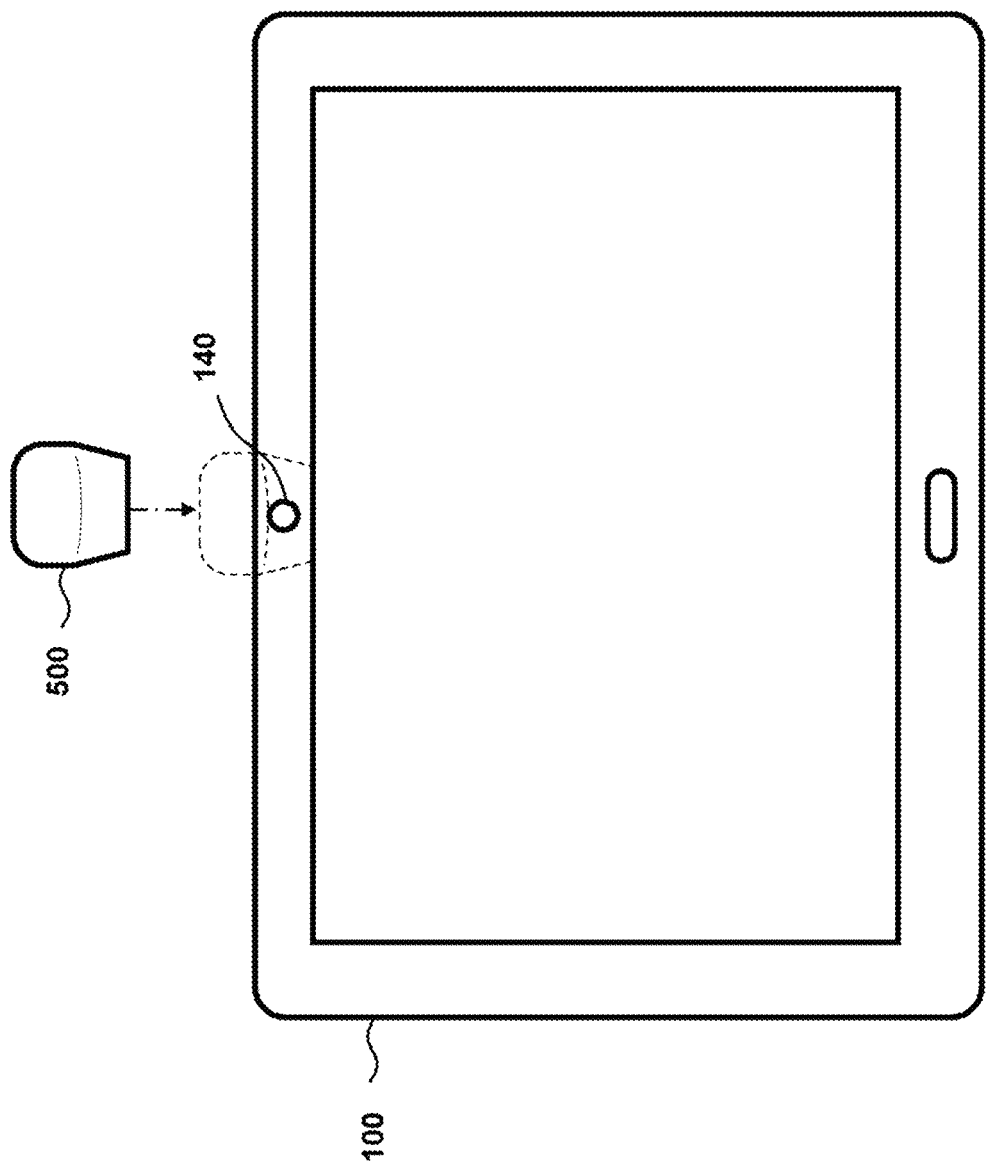
[Fig. 5]

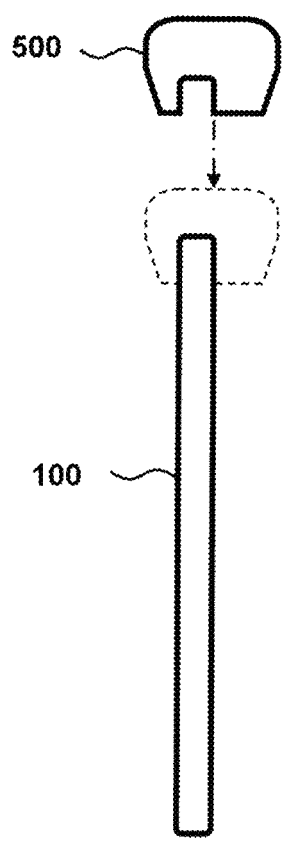

[FIG. 7]
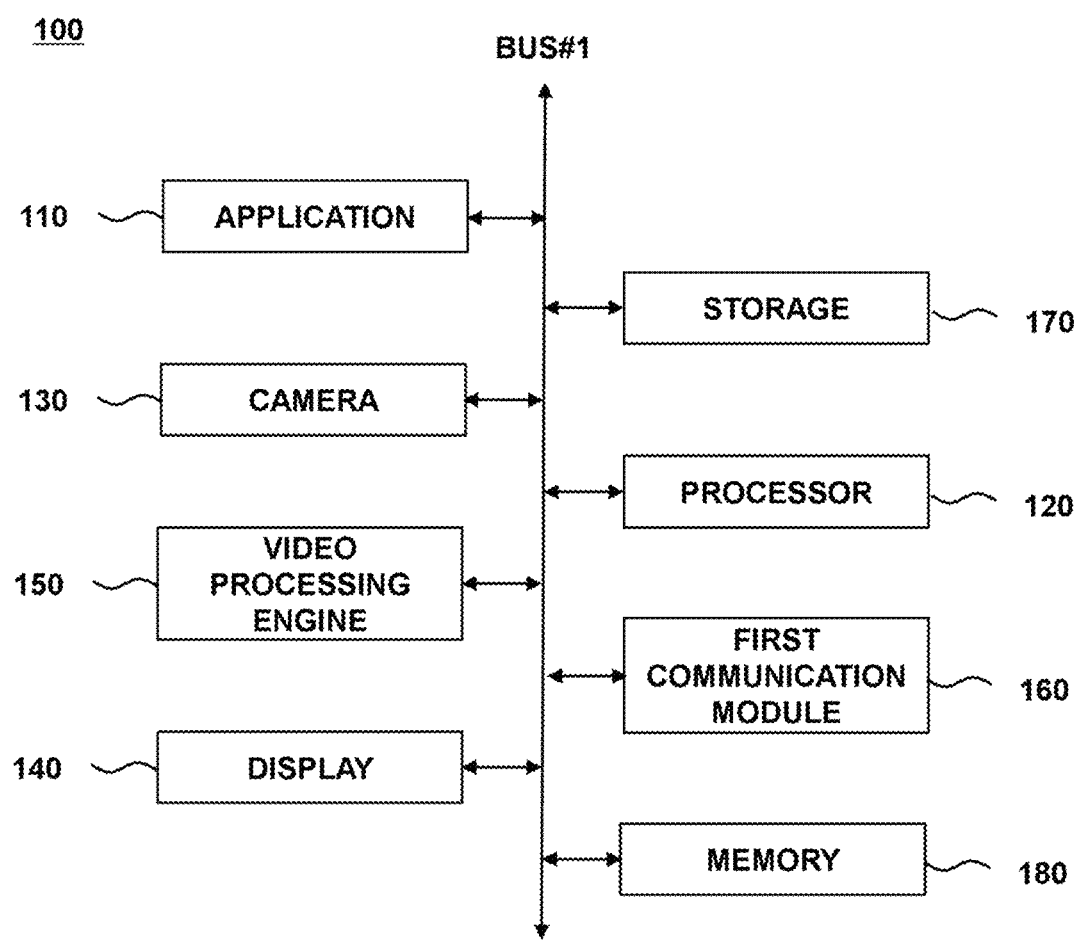

[FIG. 8]
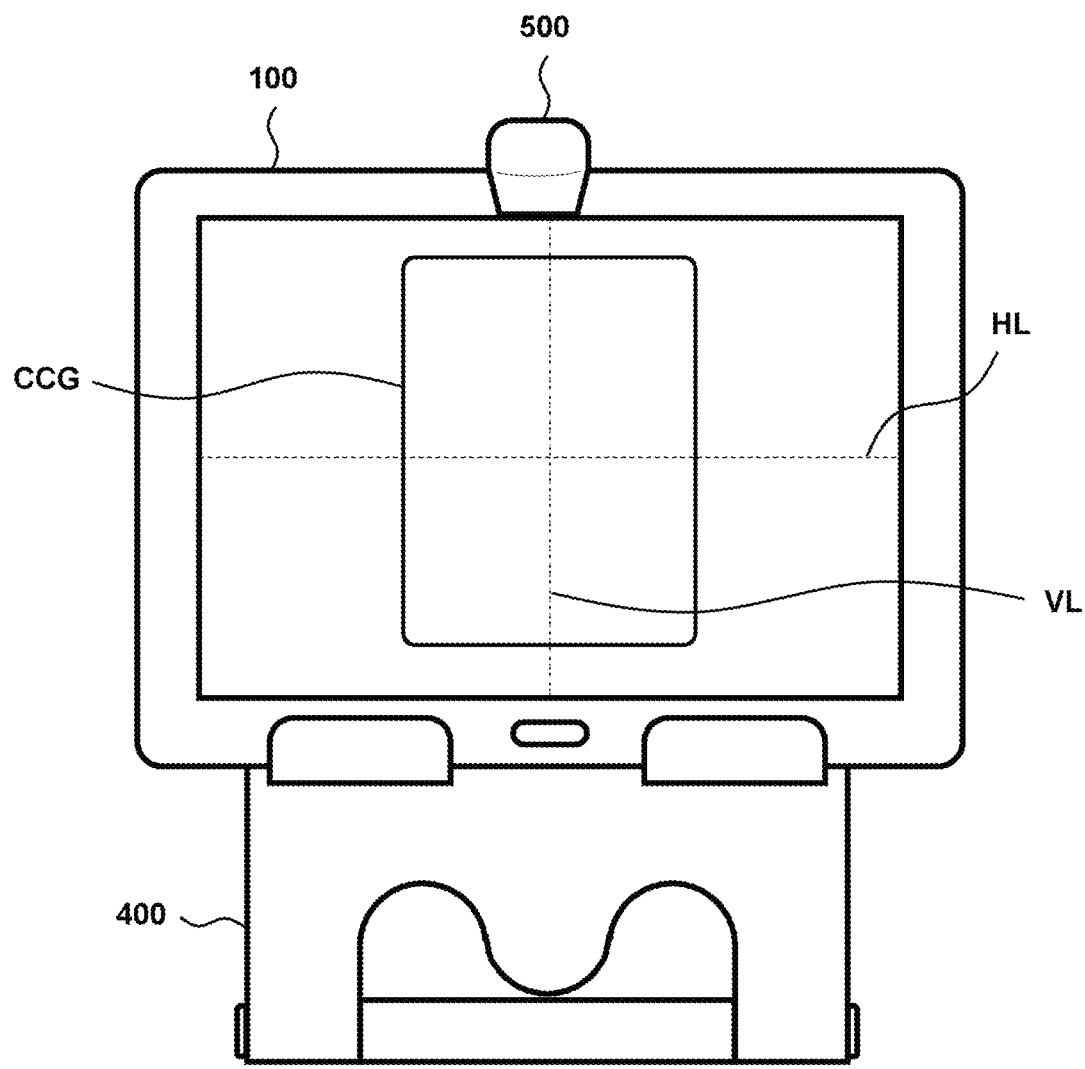

[FIG. 9]
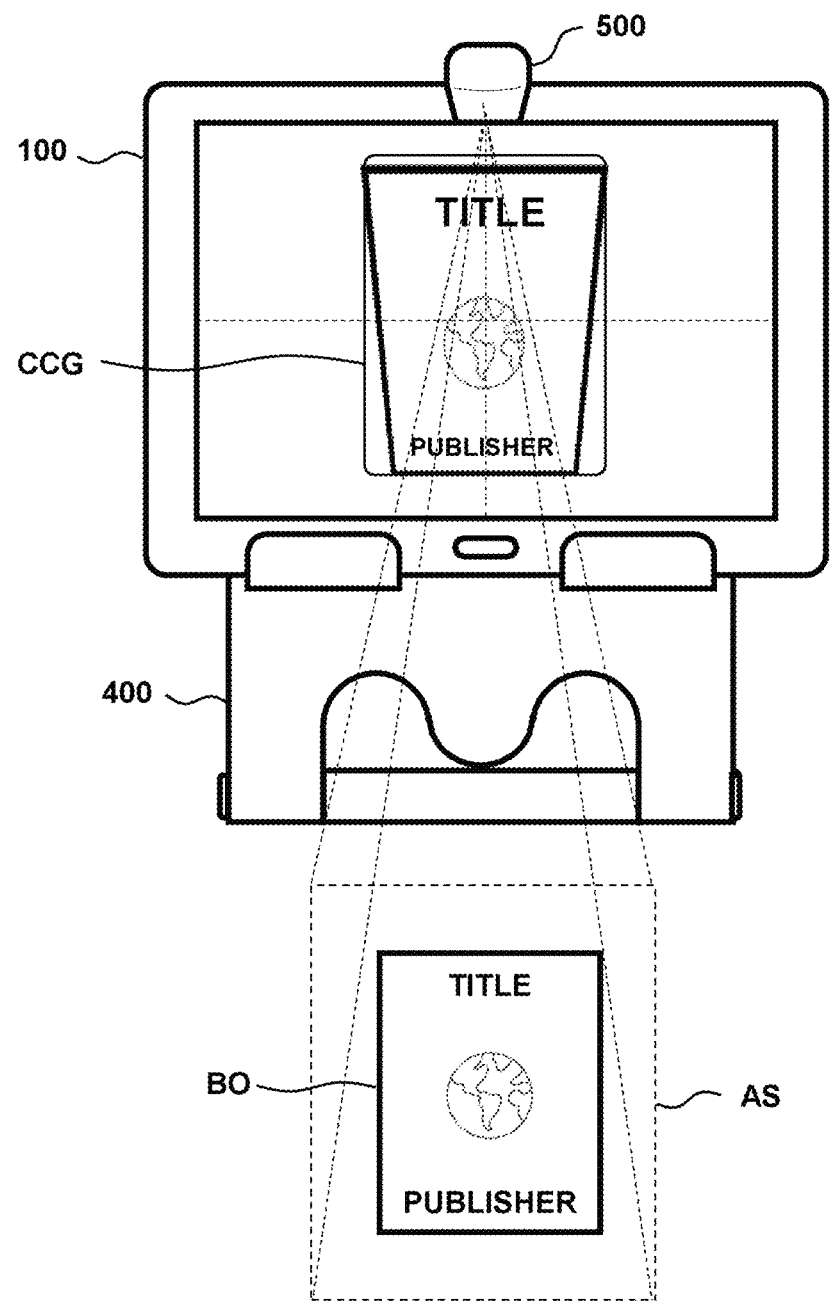

[FIG. 10]
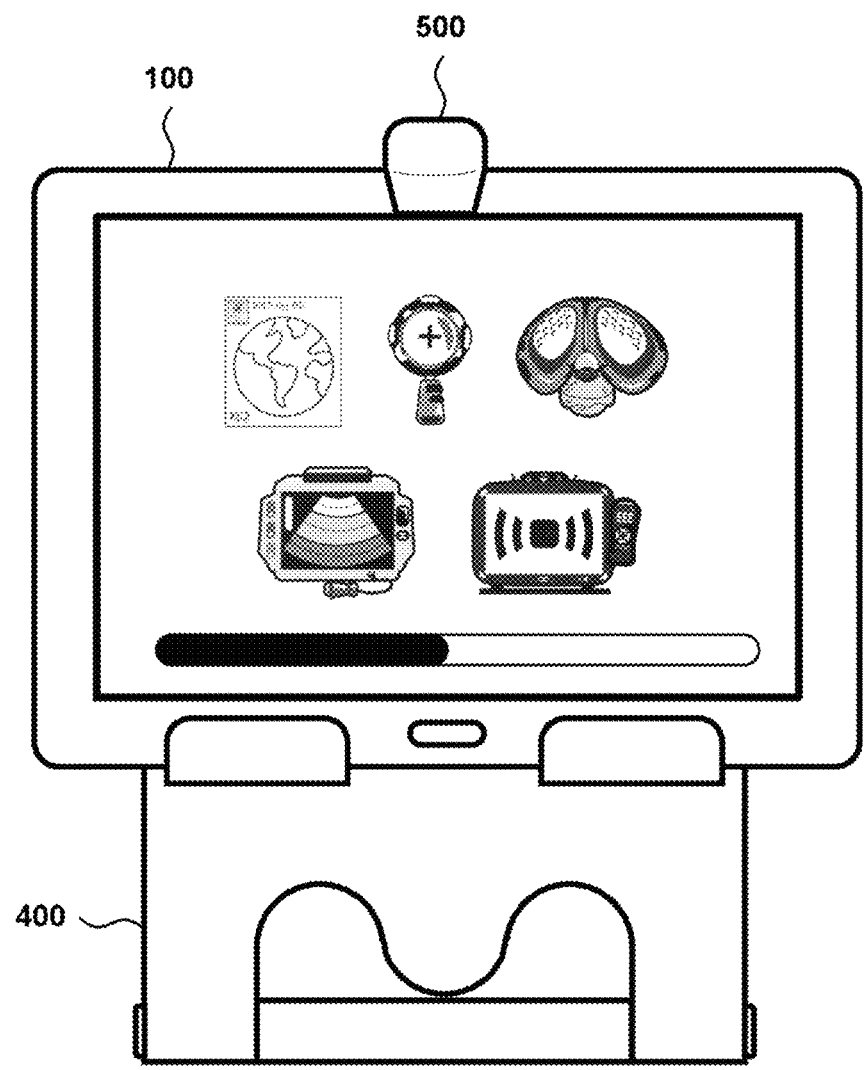

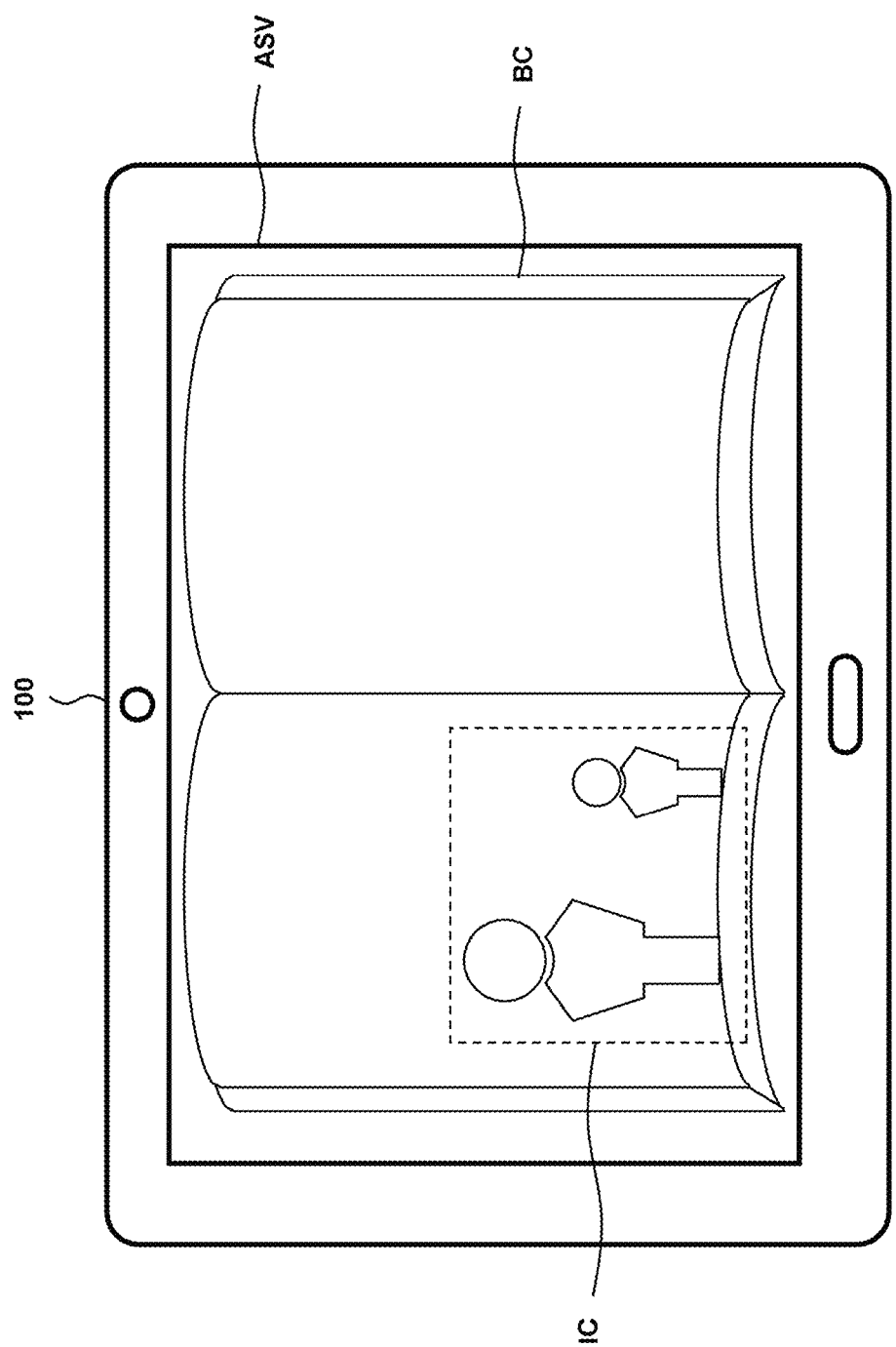
[Fig. 11]

[FIG. 12]
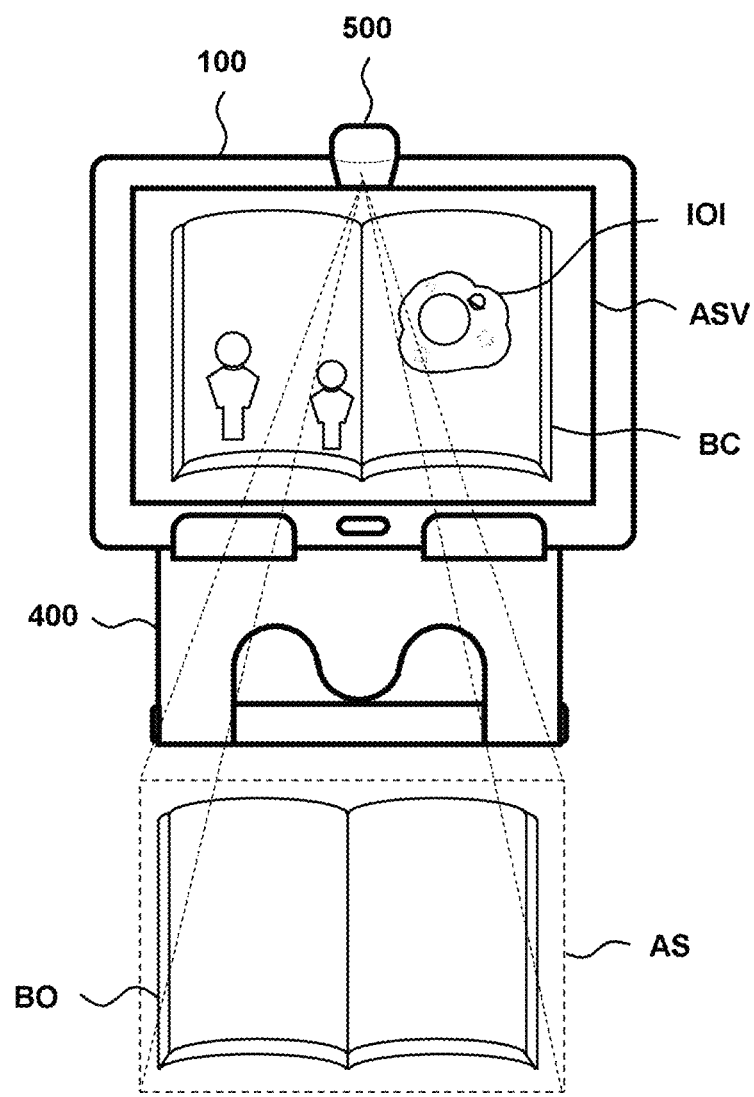

[FIG. 13]
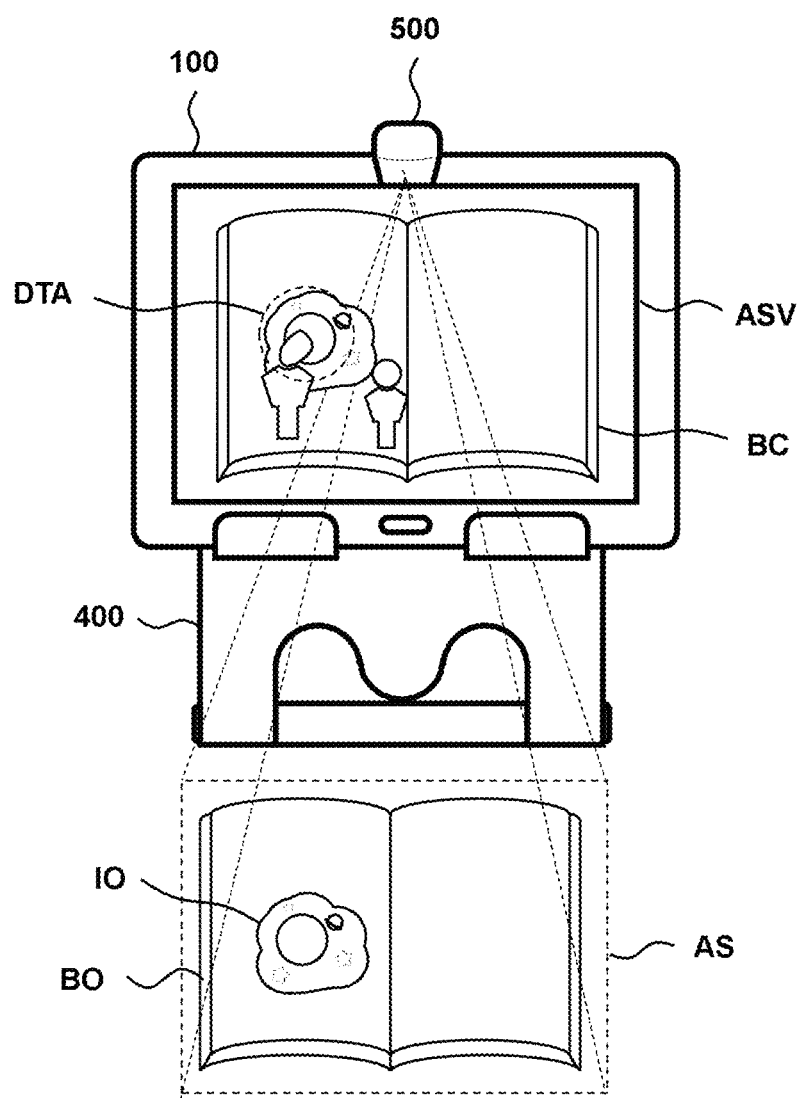

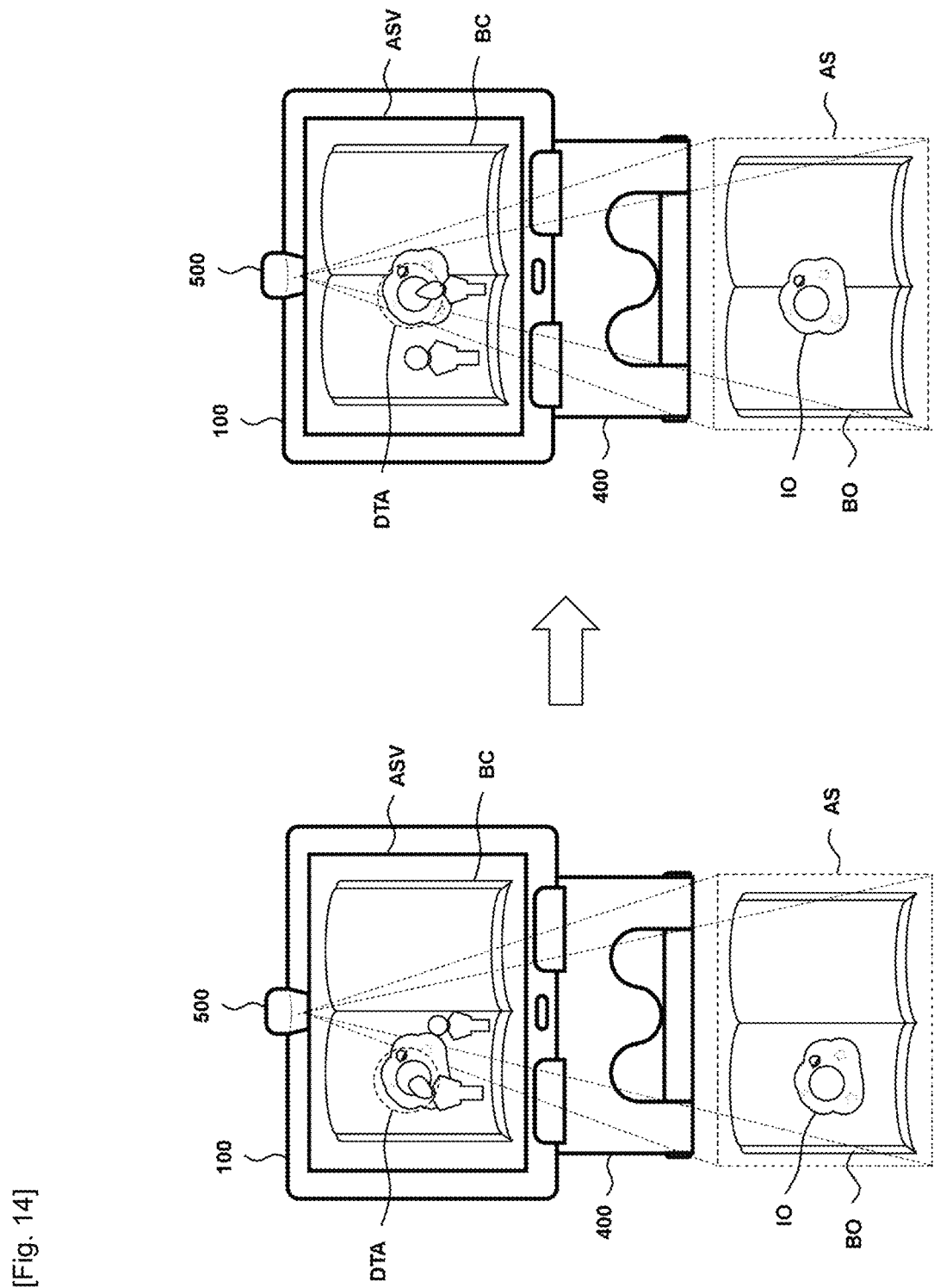

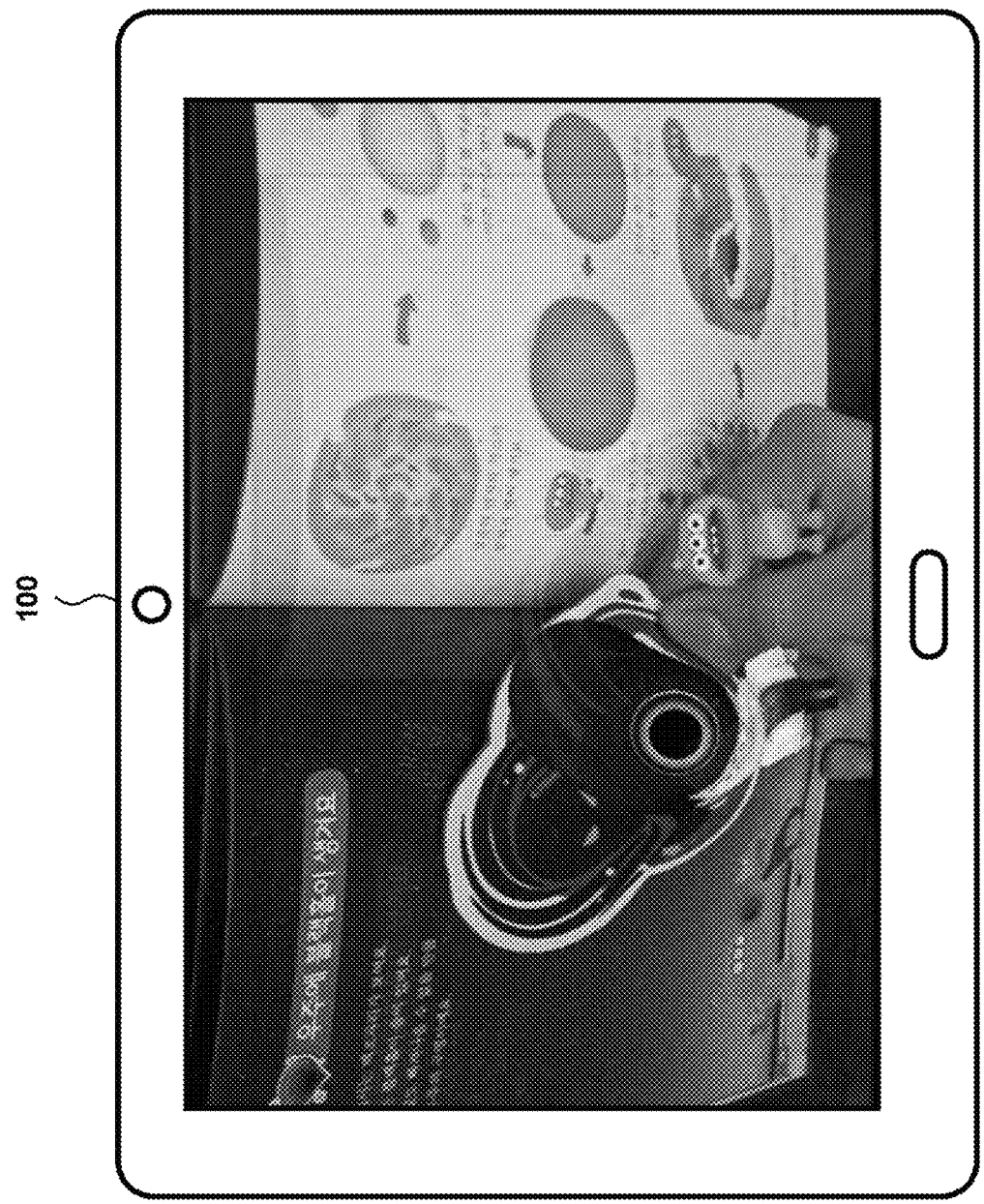
[Fig. 15]

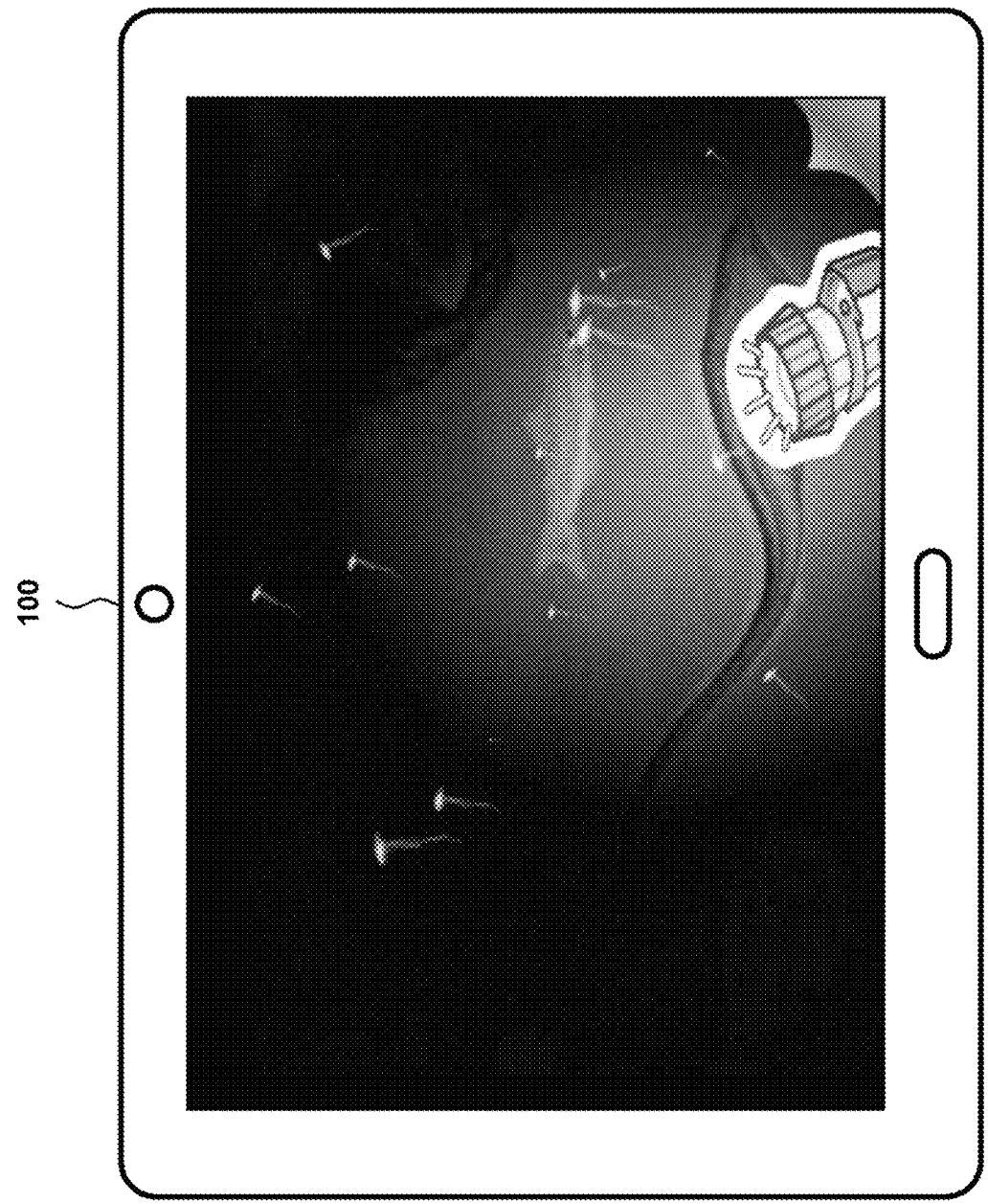
[Fig. 16]

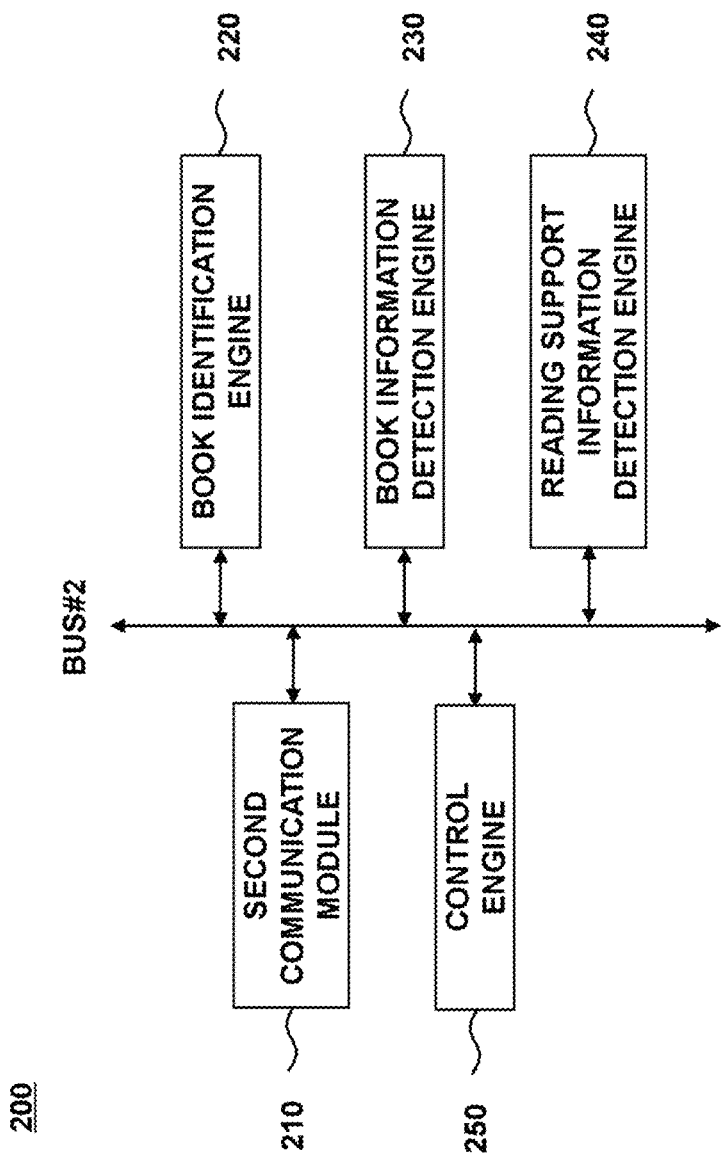
[Fig. 17]

[Fig. 18]
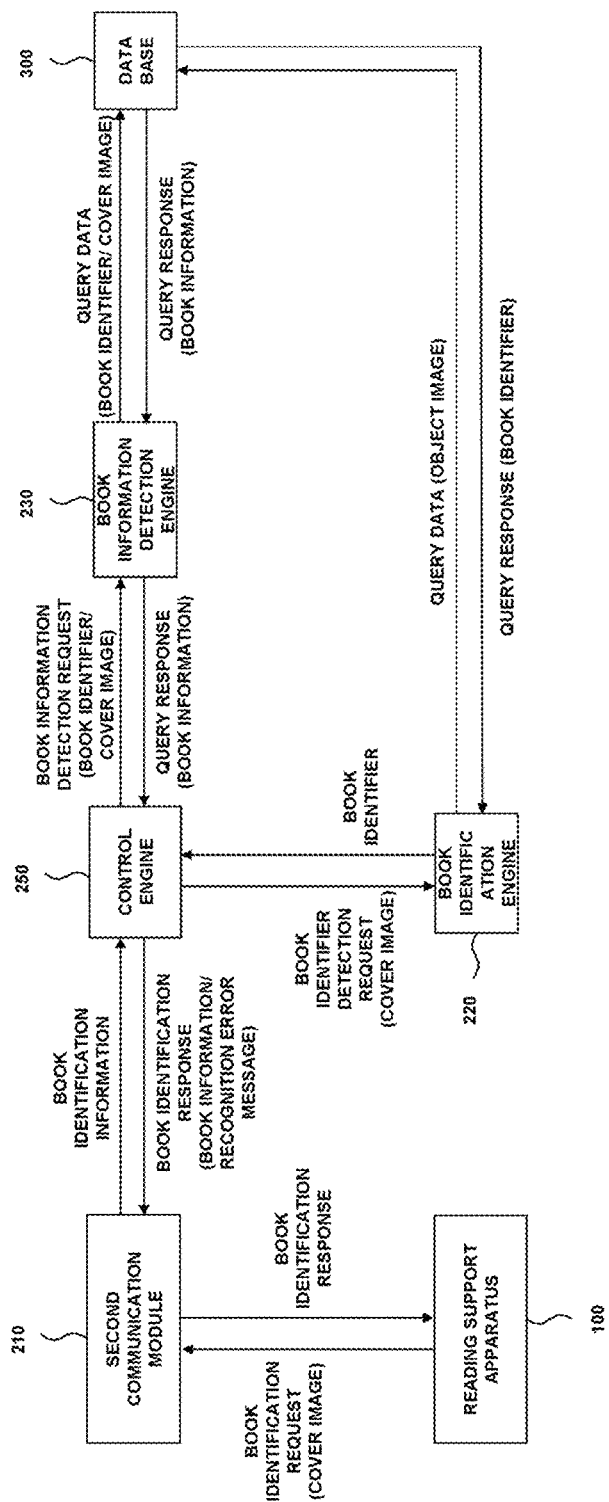

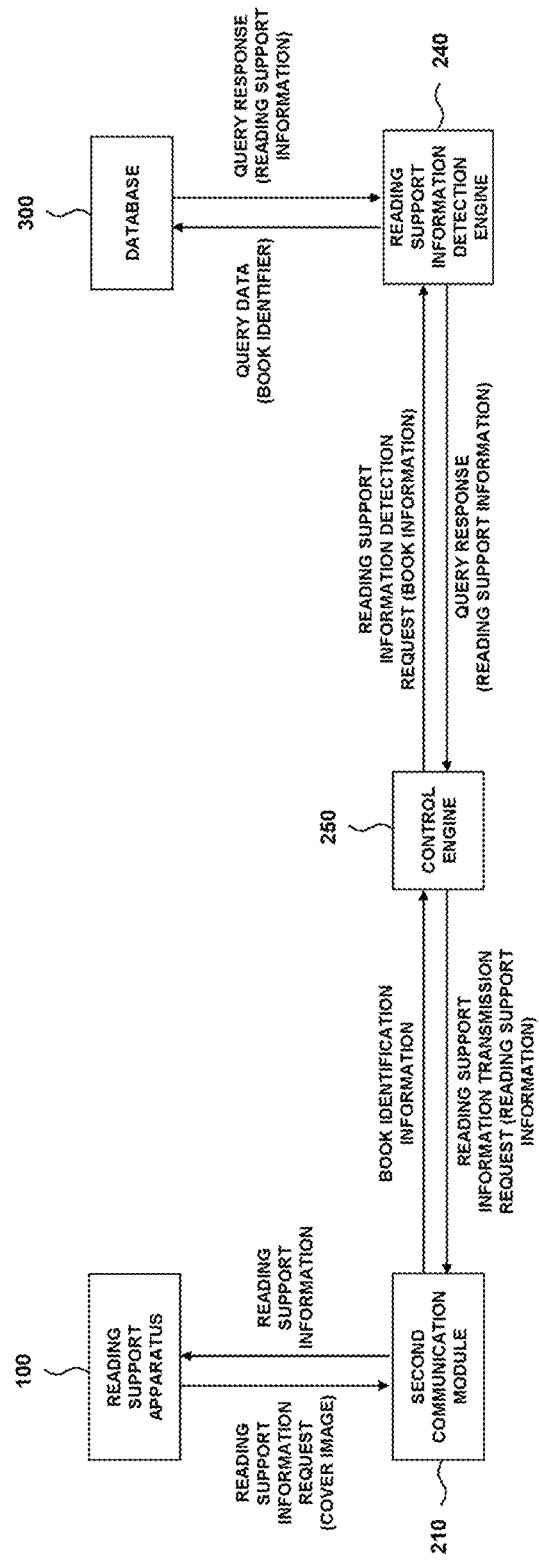
[Fig. 19]

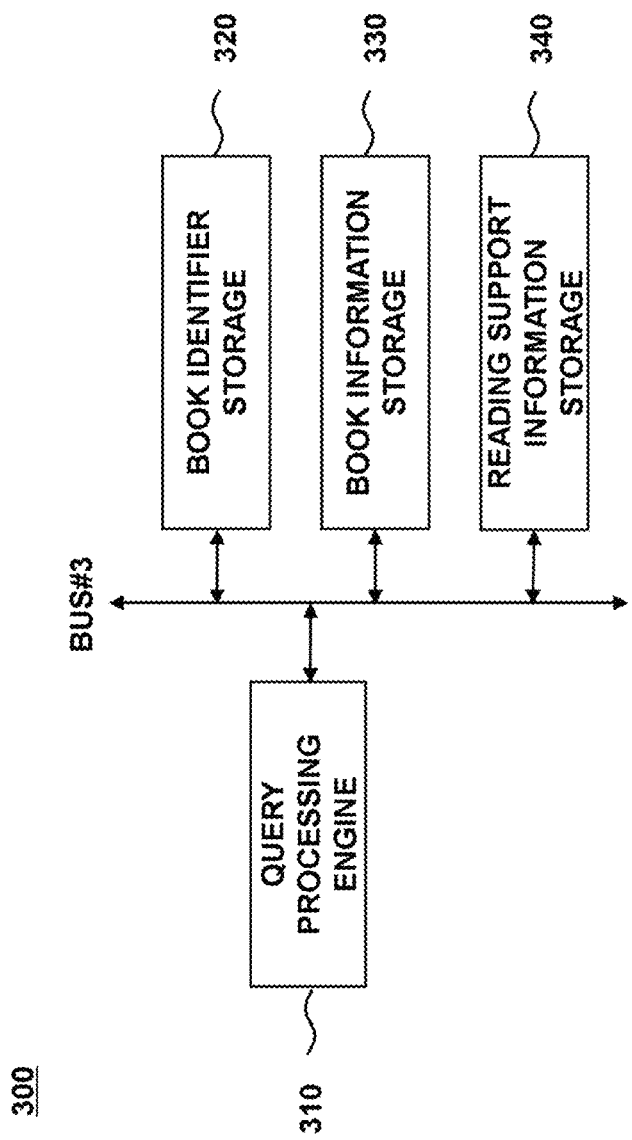
[Fig. 20]

[Fig. 21]

| BOOK IDENTIFIER | BOOK NAME | BOOK GROUP NAME | PUBLISHER |
|---|---|---|---|
| a0001 | TITLE IMAGE #1 | GROUP IMAGE #1 | A PUBLISHER IMAGE |
| a0002 | TITLE IMAGE #2 | GROUP IMAGE #1 | B PUBLISHER IMAGE |
| ⋮ | ⋮ | ⋮ | ⋮ |
| a000n | TITLE IMAGE #n | GROUP IMAGE #k | C PUBLISHER IMAGE |

[Fig. 22]

| BOOK IDENTIFIER | BOOK NAME | INTERACTIVE OBJECT IMAGE |
|---|---|---|
| a0001 | TITLE#1 | INTERACTIVE OBJECT IMAGE #1<br>INTERACTIVE OBJECT IMAGE #2<br>INTERACTIVE OBJECT IMAGE #5 |
| a0002 | TITLE#2 | INTERACTIVE OBJECT IMAGE #2<br>INTERACTIVE OBJECT IMAGE #3<br>INTERACTIVE OBJECT IMAGE #4 |
| ⋮ | ⋮ | ⋮ |
| a000n | TITLE#n | INTERACTIVE OBJECT IMAGE #7<br>INTERACTIVE OBJECT IMAGE #8<br>INTERACTIVE OBJECT IMAGE #9 |

[Fig. 23]

| BOOK IDENTIFIER | PAGE | PAGE IMAGE | INTERACTIVE OBJECT IMAGE | ADDITIONAL VIDEO |
|---|---|---|---|---|
| a0001 | Page 2 | PAGE IMAGE #1-2 | INTERACTIVE OBJECT IMAGE #1 | ADDITIONAL VIDEO#1 |
| a0001 | Page 3 | PAGE IMAGE #1-3 | | ADDITIONAL VIDEO#2 |
| a0001 | Page 4 | PAGE IMAGE #1-4 | INTERACTIVE OBJECT IMAGE #5 | ADDITIONAL VIDEO#3 |
| a0001 | Page 5 | PAGE IMAGE #1-5 | | |
| ⋮ | ⋮ | ⋮ | ⋮ | ⋮ |
| a0001 | Page n | PAGE IMAGE #1-n | INTERACTIVE OBJECT IMAGE #5 | ADDITIONAL VIDEO#k |

[FIG. 24]
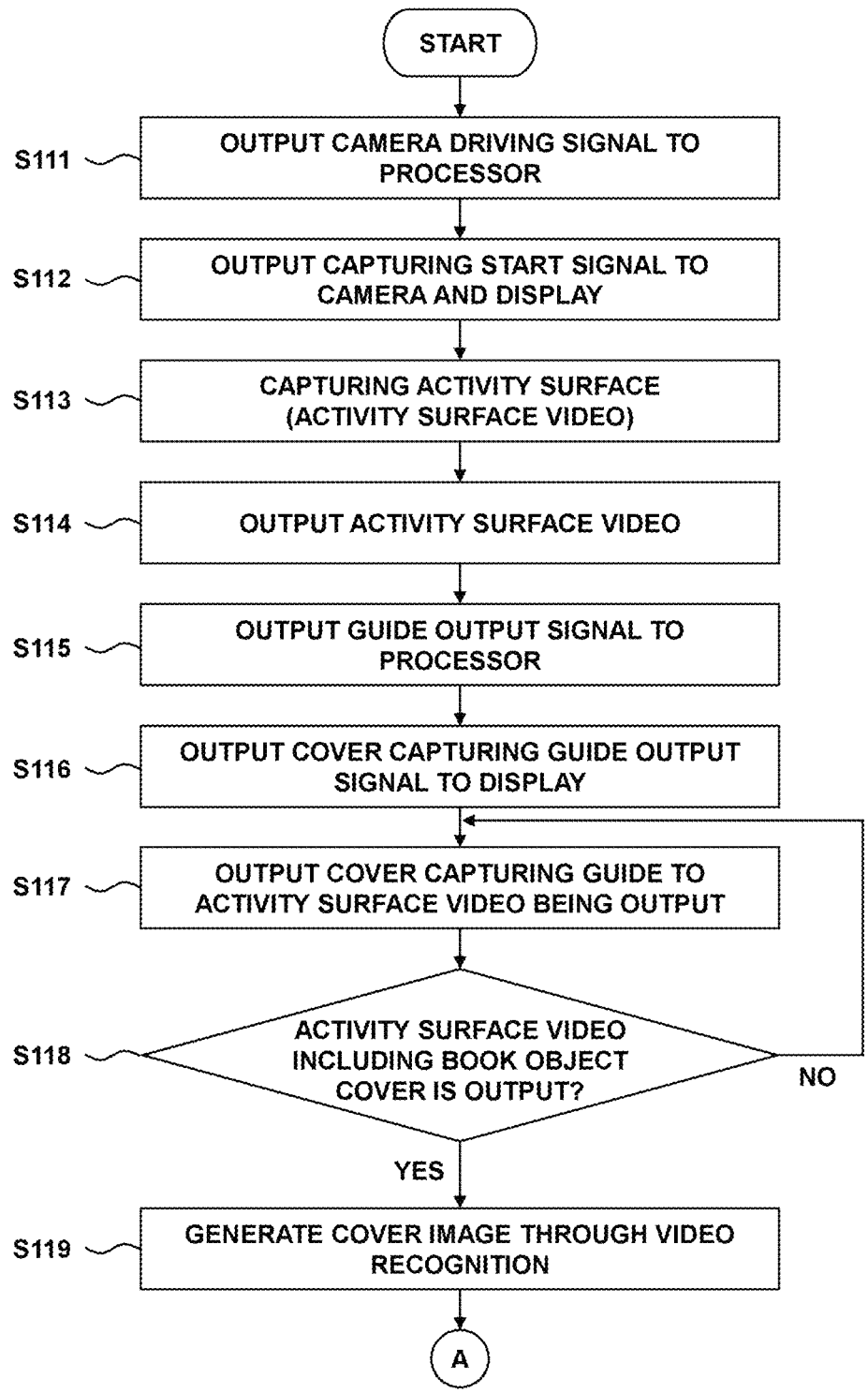

[FIG. 25]
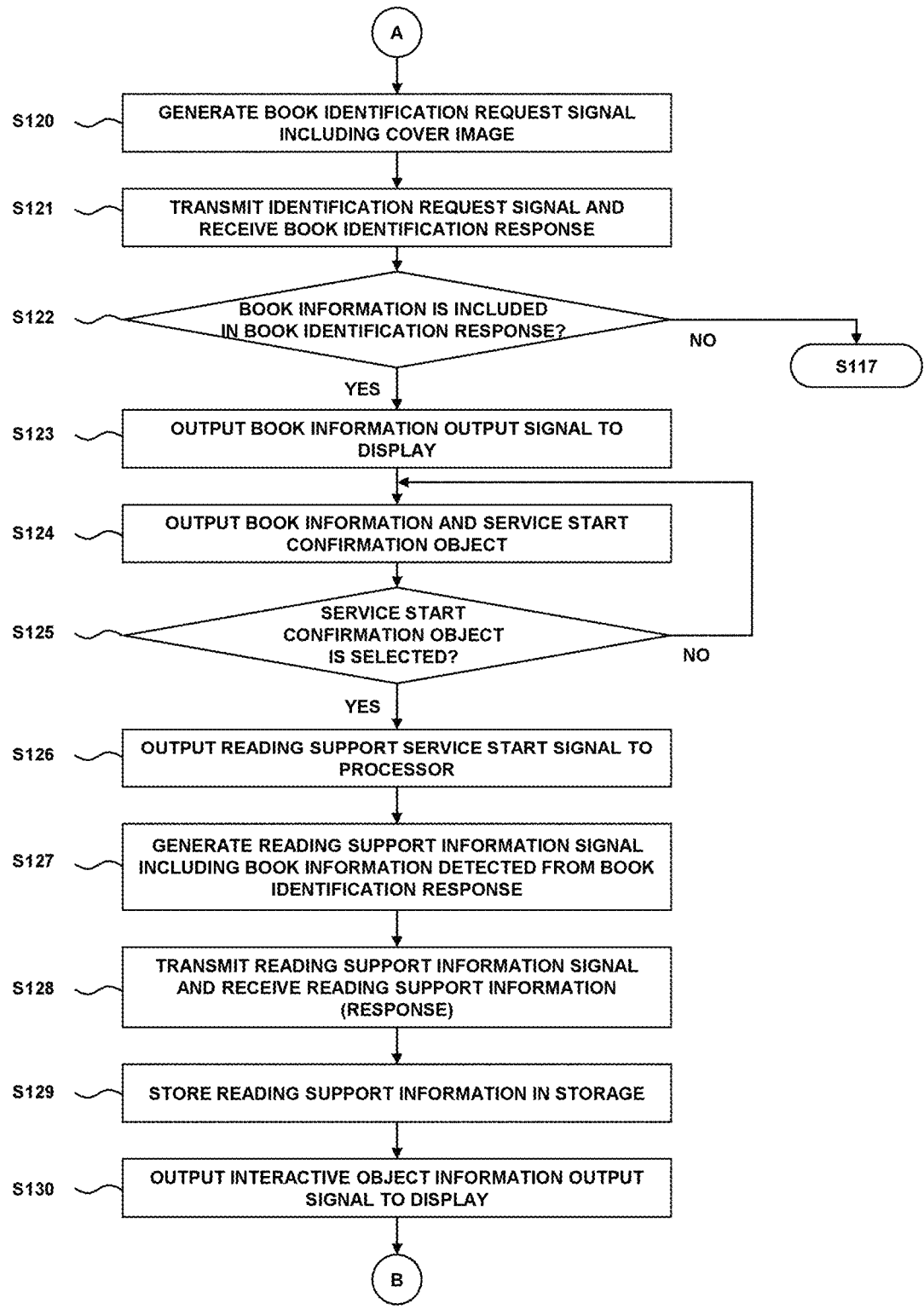

[FIG. 26]
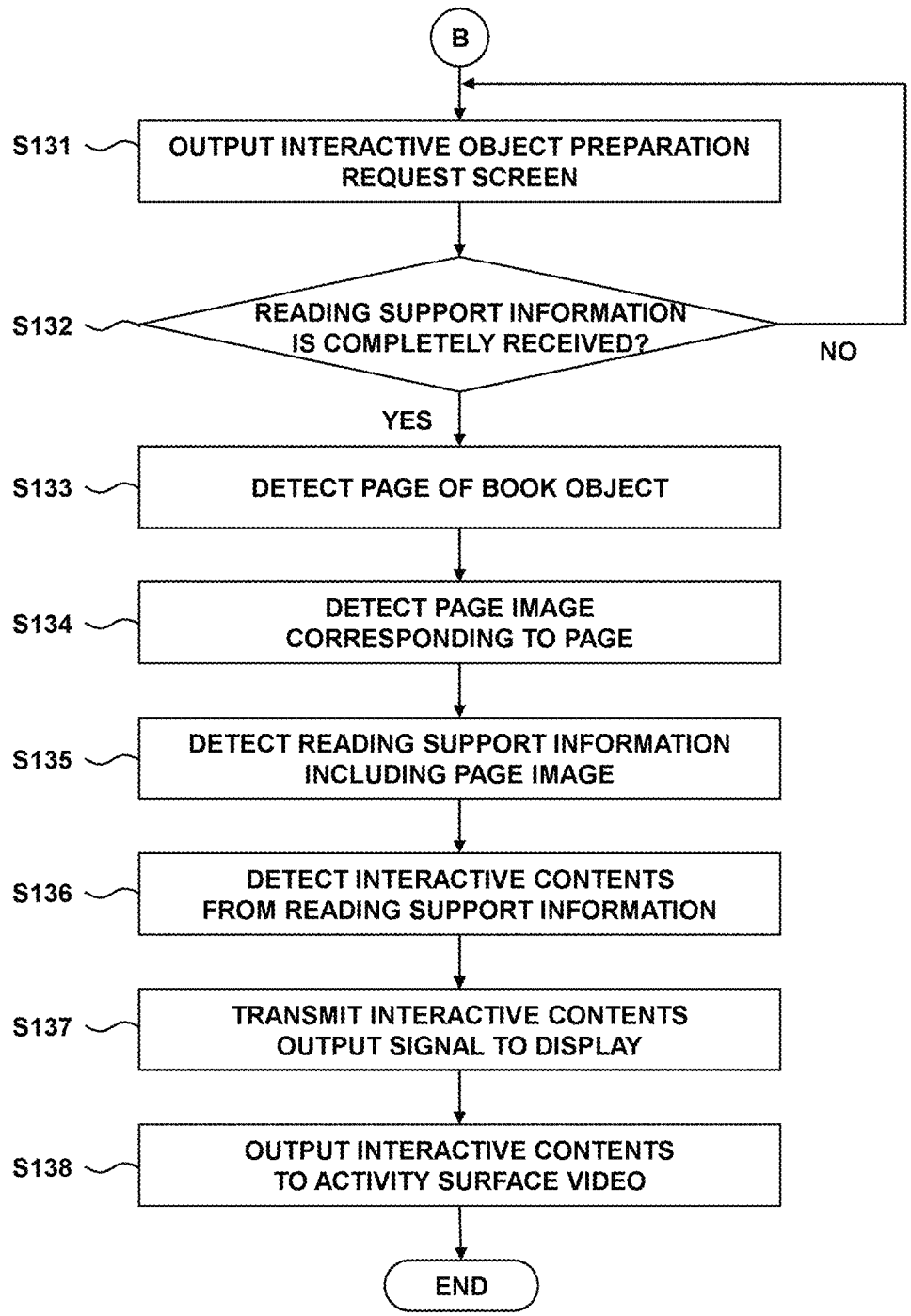

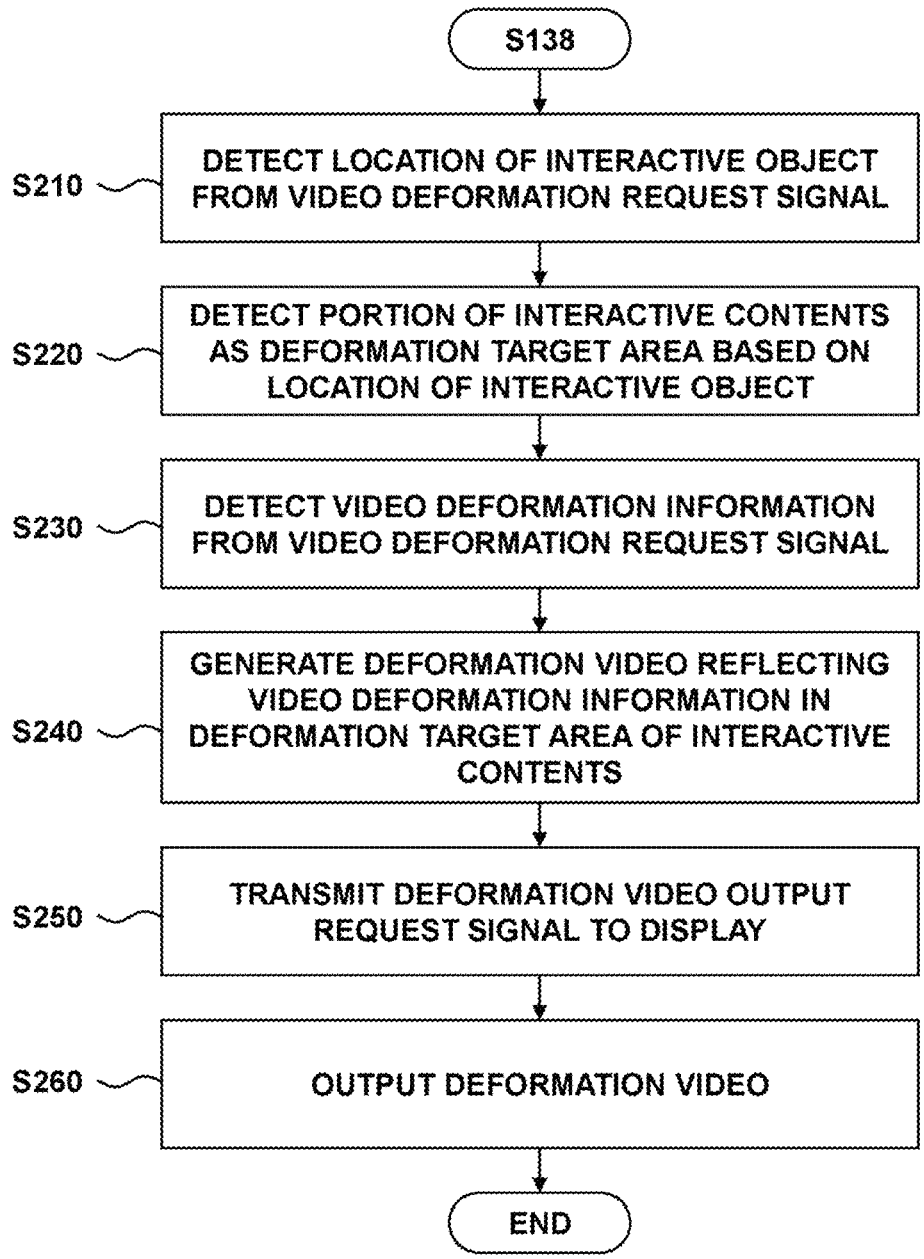

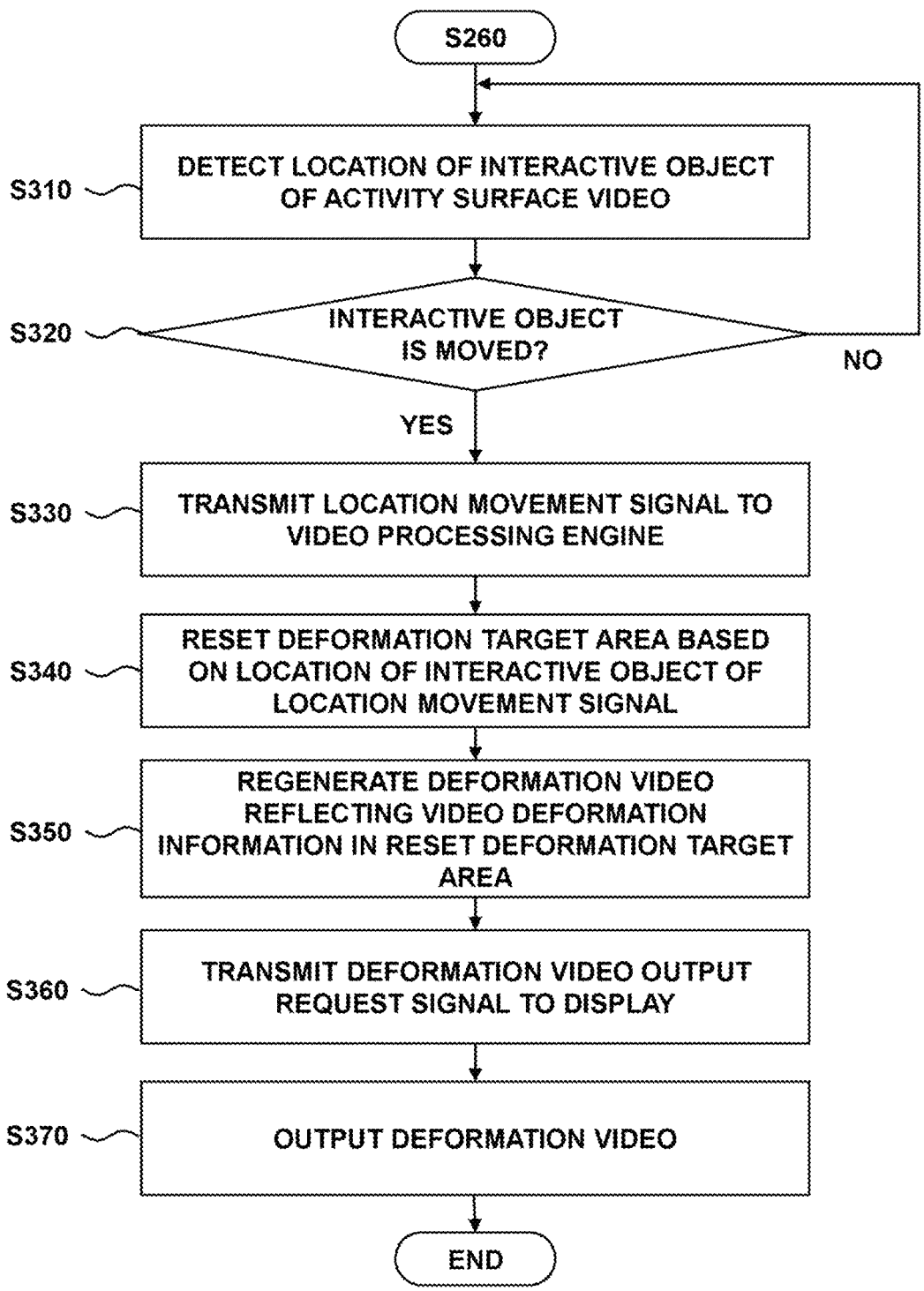

READING SUPPORT SYSTEM AND METHOD BY RELATING BOOK OBJECT TO INTERACTIVE CONTENT

CROSS-REFERENCE(S) TO RELATED APPLICATIONS

This application claims priority to Korean Patent Application No. 10-2020-0059957, filed on May 19, 2020, the disclosure of which is incorporated herein by reference in its entirety.

BACKGROUND OF THE DISCLOSURE

Field of the Disclosure

The present disclosure relates to a reading support system and method, and more particularly, to a reading support system and method which provide additional contents related to a real book to support a user' reading.

Description of the Related Art

Generally, a reading is an action for reading a book including text, images, and the like to acquire knowledge. Recently, as people are familiar with electronic devices such as a smartphone and a tablet, the frequency of acquiring knowledge through surfing the Internet or watching Internet videos rather than reading the real book composed of only text and images (that is, still images) increases.

Although the publishing industry replaces the real book with a multimedia book composed of text, images, voice, sound effects, and videos, a conventional multimedia book simply provides passively and one-dimensionally required information such as simply providing voice, images, and the like related to the contents of the book.

Accordingly, the publishing industry is researching various reading support technologies for inducing active reading and active reading participation.

The above description of the background art is for helping understanding of the background of the disclosure, and may include matters other than the related art already known to those skilled in the art to which this technology belongs.

SUMMARY OF THE DISCLOSURE

The present disclosure is proposed in consideration of the above circumstances, and an object of the present disclosure is to provide a reading support system and method which change and output a portion of interactive contents in corresponding to a location of an interactive object.

In order to achieve the object, a reading support system according to an exemplary embodiment of the present disclosure includes a reading support apparatus disposed on a physical surface having an activity surface on which an interactive object is disposed, and has one or more processors, and the reading support apparatus includes: a video processing engine configured to receive an activity surface video including the activity surface and one or more interactive objects disposed on the activity surface, perform a video analysis for the activity surface video, and detect the interactive object and a location of the interactive object which is the coordinate in the activity surface video as a result of the video analysis; a processor connected to the video processing engine for communication and configured to detect interactive contents related to the activity surface video and the interactive object detected by the video processing engine and output an output signal including the interactive contents; and a display connected to the video processing engine and the processor for communication and configured to output the activity surface video and output the interactive contents to the activity surface video in response to the output signal to output the interactive contents so as to overlap the interactive object of the activity surface video, the processor transmits a video deformation request signal including the location of the interactive object and video deformation information to the video processing engine after the interactive contents are output, the video processing engine detects the location of the interactive object from the video deformation request signal in response to the video deformation request signal, detects at least a portion of the interactive contents as a deformation target area based on the location of the interactive object, detects the video deformation information from the video deformation request signal, and generates a deformation video reflecting the video deformation information in the deformation target area of the interactive contents, the processor transmits a deformation video output request signal including the deformation video generated by the video processing engine to the display, and the display replaces the interactive contents being output with the deformation video to output the deformation video.

The processor may output a location movement signal including the location of the interactive object detected by the video processing engine when the location of the interactive object is moved, the video processing engine may reset the deformation target area in response to the location movement signal, the video processing engine may regenerate the deformation video reflecting the video deformation information in the reset deformation target area, and the processor may transmit the deformation video output request signal including the deformation video regenerated by the video processing engine to the display.

The processor may determine that the interactive object is moved when the location of the interactive object detected by the video processing engine is different from a just before detected location of the interactive object.

The video processing engine may center on the location of the interactive object of the interactive contents, and set an area having a set area as the deformation target area.

The video processing engine may set an area expanding outward from the outline of the interactive object as the deformation target area, or set an area expanding outward from a partial surface of the interactive object as the deformation target area. The video deformation information may be graphic conversion information of one of blur, distortion, and brightness level.

The reading support apparatus may further include: a camera which is configured to shoot the activity surface video including the activity surface of the physical surface and the one or more interactive objects disposed on the activity surface, and to transmit the activity surface video to the video processing engine and the display.

In order to achieve the object, a reading support method according to an exemplary embodiment of the present disclosure includes: outputting, by a display, an activity surface video including an activity surface and one or more interactive objects disposed on the activity surface; performing, by a video processing engine, a video analysis for the activity surface video, and detecting the interactive object and a location of the interactive object which is the coordinate in the activity surface video as a result of the video analysis; detecting, by a processor, interactive contents related to the activity surface video and the interactive object; outputting, by the processor, an output signal including the interactive contents; outputting, by the display, the interactive contents in response to the output signal to output the interactive contents so as to overlap the interactive object of the activity surface video; outputting, by the processor, a video deformation request signal including the location of the interactive object and video deformation information after the outputting of the interactive contents; detecting, by the video processing engine, the location of the interactive object from the video deformation request signal in response to the video deformation request signal, and setting at least a portion of the interactive contents as a deformation target area based on the location of the interactive object; detecting, by the video processing engine, video deformation information from the video deformation request signal in response to the video deformation request signal, and generating a deformation video reflecting the video deformation information in the deformation target area of the interactive contents; outputting, by the processor, a deformation video output request signal including the deformation video generated in the generating of the deformation video; and replacing, by the display, the interactive contents being output with the deformation video in response to the deformation video output request signal to output the deformation video.

The reading support method according to an exemplary embodiment of the present disclosure may further include: outputting, by the processor, a location movement signal including the location of the interactive object when the location of the interactive object is moved; resetting, by the video processing engine, the deformation target area in response to the location movement signal; regenerating, by the video processing engine, the deformation video reflecting the video deformation information in the deformation target area reset in the resetting; and outputting, by the processor, a deformation video output request signal including the deformation video regenerated by the video processing engine.

The outputting of the location movement signal may output the location movement signal by determining that the interactive object is moved when the location of the interactive object is different from a just before detected location of the interactive object.

The setting of at least the portion of the interactive contents as the deformation target area may center on the location of the interactive object of the interactive contents, set an area having a set area as the deformation target area, set an area expanding outward from the outline of the interactive object as the deformation target area, or set an area expanding outward from a partial surface of the interactive object as the deformation target area.

The generating of the deformation video may generate a deformation video reflecting video deformation information of one of blue, distortion, and brightness level in the deformation target area.

The reading support method according to an exemplary embodiment of the present disclosure may further include: capturing, by a camera, the activity surface video including the activity surface of the physical surface and one or more interactive objects disposed on the activity surface.

According to the present disclosure, the reading support system and method may change the interactive contents displayed on the display in corresponding to the location of the interactive object changed by the user, thereby providing the environment in which the user may focus on the reading compared to the related art which provides the predetermined additional video at the predetermined time.

Further, the reading support system and method may change the interactive contents displayed on the display in corresponding to the location of the interactive object changed by the user, thereby inducing the active reading participation of the user using the interactive object.

Further, the reading support system and method may change the interactive contents displayed on the display in corresponding to the location of the interactive object changed by the user, thereby inducing the active reading compared to the related art which outputs the interactive contents to the predetermined location.

The aforementioned technical effects of the present disclosure are not limited to the aforementioned effects, and other technical effects not mentioned will be clearly understood by those skilled in the art from the following description.

BRIEF DESCRIPTION OF THE DRAWINGS

FIG. 1 is a diagram for explaining a reading support system according to an exemplary embodiment of the present disclosure.

FIG. 2 is a diagram for explaining a reading support apparatus according to an exemplary embodiment of the present disclosure.

FIGS. 3 and 4 are diagrams for explaining a holder for using the reading support apparatus illustrated in FIG. 1.

FIGS. 5 and 6 are diagrams for explaining an adaptor for using the reading support apparatus illustrated in FIG. 1.

FIG. 7 is a diagram for explaining a configuration of the reading support apparatus illustrated in FIG. 1.

FIGS. 8 to 14 are diagrams for explaining an operation of the reading support apparatus illustrated in FIG. 1.

FIGS. 15 and 16 are diagrams for explaining an operation in which the reading support apparatus illustrated in FIG. 1 changes and outputs a portion of the interactive contents based on the location of an interactive object and video change information.

FIG. 17 is a diagram for explaining a configuration of a service server illustrated in FIG. 1.

FIGS. 18 and 19 are diagrams for explaining an operation of the service server illustrated in FIG. 1.

FIG. 20 is a diagram for explaining a configuration of a database illustrated in FIG. 1.

FIG. 21 is a diagram for explaining a book identifier storage illustrated in FIG. 20.

FIG. 22 is a diagram for explaining a book information storage illustrated in FIG. 20.

FIG. 23 is a diagram for explaining a book support information storage illustrated in FIG. 20.

FIGS. 24 to 26 are flowcharts for explaining a reading support method by relating a book object to interactive contents according to an exemplary embodiment of the present disclosure.

FIG. 27 is a flowchart for explaining an example of changing and outputting a portion of the interactive contents based on the location of the interactive object and the video change information in the reading support method according to an exemplary embodiment of the present disclosure.

FIG. 28 is a flowchart for explaining another example of changing and outputting a portion of the interactive contents based on the location of the interactive object and the video change information in the reading support method according to an exemplary embodiment of the present disclosure.

DESCRIPTION OF SPECIFIC EMBODIMENTS

Hereinafter, for specifically describing the present disclosure so that those skilled in the art to which the present disclosure pertains may easily carry out the technical spirit of the present disclosure, the most preferred embodiment of the present disclosure will be described with reference to the accompanying drawings. First, in adding the reference numerals to components of each drawing, it should be noted that the same components have the same reference numerals as possible even though they are illustrated on different drawings. Further, in describing the present disclosure, when it is determined that detailed descriptions of related known configurations or functions may obscure the subject matter of the present disclosure, the detailed descriptions thereof will be omitted.

Those skilled in the art will appreciate that various exemplary blocks, apparatuses, or operations described in connection with the configurations disclosed the present specification may be implemented by electronic hardware, computer software, or a combination thereof. These blocks, apparatuses, or operations may be implemented or performed using a processor, a digital signal processor (DSP), an application-specific integrated circuit (ASIC) or an application-specific standard product (ASSP), a field-programmable gate array (FPGA) or other programmable logic device, an individual gate or transistor logic, an individual hardware component or any combination thereof designed to produce a configuration as disclosed in the present specification. The processor may be implemented by a combination of computing devices, for example, a combination of a DSP and a microprocessor, multiple microprocessors, one or more microprocessors connected to a DSP core, or any other configuration. Computer software or program may exist in a random access memory (RAM), a read-only memory (ROM), a non-volatile RAM such as a flash RAM, an erasable and programmable ROM (EPROM), an electrically erasable and programmable ROM (EEPROM), a register, a hard disk, a removable disk, a CD-ROM, or any other form of storage medium known in the art, and may include machine-readable instructions which may be executed by an array of logical elements such as a processor or DSP. An exemplary storage medium may be coupled with the processor, and the processor may read information from the storage medium and write the information to the storage medium. Alternatively, the storage medium may be integral with the processor. The processor and the storage medium may be located within the ASIC. The ASIC may be located in the user terminal. Alternatively, the processor and the storage medium may be present as individual components within the user terminal.

Referring to FIG. 1, a reading support system according to an exemplary embodiment of the present disclosure is configured to include a reading support apparatus 100, a service server 200, and a database 300. Here, although it is illustrated in FIG. 1 that the service server 200 and the database 300 are separately configured to easily describe an exemplary embodiment of the present disclosure, the service server 200 and the database 300 are not limited thereto and may be configured as a single server, or may also be implemented in a module form in the reading support apparatus 100.

The reading support apparatus 100 is composed of a terminal with a capturing function. As an example, the reading support apparatus 100 is a smartphone, a tablet, a laptop, or the like equipped with a camera 130 capable of capturing a video. The reading support apparatus 100 is connected to the service server 200 and the database 300 through a network to transmit and receive various information for providing the reading support service.

Referring to FIG. 2, the reading support apparatus 100 photographs an activity surface (AS) in which a book object (BO) is disposed through the camera 130. Here, the activity surface (AS) refers to a partial surface of the physical surface on which the reading support apparatus is disposed.

The reading support apparatus 100 outputs an activity surface video (ASV) including book contents (BC) using a display 140. Here, the activity surface (AS) refers to a partial surface of the bottom surface on which the reading support apparatus 100 and the book object (BO) are disposed, and is a surface including the surface on which the book object (BO) is disposed. The activity surface video (ASV) is a video obtained by capturing the activity surface (AS) through the camera 130. The book object (BO) is a real book, and the book contents (BC) are contents displayed on the display 140 and include text, images, and the like included in each page of the book object (BO).

When an interactive object (IO) is recognized in the activity surface video (ASV), the reading support apparatus 100 outputs the interactive contents (IC) corresponding to the recognized interactive object (IO) using the display 140.

If the user grips the reading support apparatus 100, the reading support apparatus 100 may be shaken or moved. In this case, since the reading support apparatus 100 photographs only a portion of the activity surface (AS), the book object (BO) in which some of the text and images of the book object (BO) is missing is output to the display 140, or blur occurs in the activity surface video (ASV) to make it impossible to recognize the video.

Accordingly, referring to FIGS. 3 and 4, the reading support apparatus 100 photographs the activity surface (AS) while being mounted on a holder 400.

Generally, the reading support apparatus 100 is equipped with the camera 130 having a standard angle of view (40 to 50 degrees). In order to shoot all of the activity surfaces (ASs) with the camera 130 having the standard angle of view, the camera 130 and the activity surfaces (ASs) need to be disposed to be spaced apart from each other by a set distance or more.

Accordingly, the holder 400 is composed of a main body 410 and a support 420, and the main body 410 includes a fixing device 412 which supports the bottom of the reading support apparatus 100. The fixing device 412 is disposed at a location spaced apart from the activity surface (AS) by a set height (H) or more, such that the holder 400 allows the camera 130 of the reading support apparatus 100 to be spaced apart from the activity surface (AS) by the set distance or more to shoot all of the activity surfaces (ASs).

Here, the reading support apparatus 100 has a front surface on which the display 140 is disposed, a rear surface opposite to the front surface, and four side surfaces, and the bottom of the reading support apparatus 100 means the side surface of the four side surfaces of the reading support apparatus 100 disposed in a direction of the activity surface (AS) when held on the holder 400. Since the set height (H) may vary depending on the configuration of the reading support apparatus 100, the exemplary embodiment of the present disclosure does not limit the numerical value of the set height (H) separately.

Further, in order to allow the camera 130 of the reading support apparatus 100 to shoot all of the activity surfaces (ASs), the main body 410 and the support 420 are coupled to be rotatable around a coupling shaft 430. The reading support apparatus 100 is held on the front surface of the main body 410, and the support 420 rotates in a rear direction of the main body 410 around the coupling shaft 430. At this time, an angle (θ) between the main body 410 and the support 420 (an included angle) has an angle within a set angle range in order to secure an angle of view capable of capturing all of the activity surfaces (ASs).

Here, the included angle is an included angle between the main body 410 and the support 420 in a state where the support 420 is rotated and disposed in the rear direction of the main body 410. Since the set angle may vary depending on the structure of the reading support apparatus 100, the main body 410, and the support 420, the exemplary embodiment of the present disclosure does not limit the numerical value of the set angle separately.

The reading support apparatus 100 photographs the activity surface (AS) using the camera 130 (that is, the front camera) capturing the front direction in order for the user to watch the activity surface video (ASV). Generally, since the camera 130 of the reading support apparatus 100 is installed to shoot the front direction, it is impossible to shoot the activity surface (AS).

Accordingly, the reading support apparatus 100 photographs the activity surface (AS) in a state where an adaptor 500 is mounted. The adaptor 500 is configured to include a housing 520 and a reflector 540 disposed in the housing 520.

The housing 520 may be made of a material with elasticity to maintain a fastening force while preventing damage to the reading support apparatus 100 when coupled with the reading support apparatus 100. The housing 520 is mounted at the upper portion of the reading support apparatus 100, and is mounted to overlap the camera 130 disposed on the front surface of the reading support apparatus 100. Here, the upper portion of the reading support apparatus 100 means a side surface opposite to the side surface disposed in a direction of the activity surface (AS) when held on the holder 400 among the four side surfaces of the reading support apparatus 100.

The reflector 540 is disposed in the housing 520 to reflect the activity surface (AS) toward the camera 130 of the reading support apparatus 100. The reflector 540 forms an acute angle with the front surface of the reading support apparatus 100 in the housing 520, and is disposed to face the camera 130 of the reading support apparatus 100.

Referring to FIGS. 5 and 6, the adaptor 500 is fitted and coupled to an area where the camera 130 of the reading support apparatus 100 is disposed. At this time, the adaptor 500 blocks the camera 130 from capturing other surfaces through the housing 520, and reflects the activity surface (AS) to the camera 130 through the reflector 540.

Meanwhile, the reading support apparatus 100 may be formed with a guide device which guides the adaptor 500 to be mounted at an accurate location. The guide device is disposed on the reading support apparatus 100, and may be formed in one or combinations of two or more of various shapes such as a protrusion and a groove. At this time, the guide device may be integrally formed with the housing 520 of the reading support apparatus 100. When coupled with the reading support apparatus 100, the housing 520 of the adaptor 500 may be formed with the protrusion, the groove, and the like with a shape corresponding to the guide device in an area overlapped with the guide device.

The reading support apparatus 100 photographs the activity surface (AS) in which the book object (BO) is disposed through the adaptor 500 while held on the holder 400. The reading support apparatus 100 outputs the interactive contents (IC) related to the book contents (BC) using the activity surface video (ASV) generated as the shot result. At this time, the reading support apparatus 100 outputs the interactive contents (IC) so as to overlap (overwrite) the activity surface video (ASV).

Here, as an example, the interactive contents (IC) mean contents which output an additional video to a real-time video such as Augmented Reality (AR) contents, Mixed Reality (MR) contents, or eXtended Reality (XR) contents.

Referring to FIG. 7, the reading support apparatus 100 is configured to include an application 110, a processor 120, the camera 130, the display 140, a video processing engine 150, a first communication module 160, a storage 170, and a memory 180. The application 110, the processor 120, the camera 130, the display 140, the video processing engine 150, the first communication module 160, the storage 170, and the memory 180 receive or output signals and data through a bus. Hereinafter, the disclosure of the present application may be described by referring to FIG. 7 without mentioning.

The user drives the application 110 installed in the reading support apparatus 100 to use the reading support service. That is, after driving the reading support apparatus 100, the user executes the application 110 which supports the reading support service through an operation such as touch, click, or double click.

The application 110 is activated by the user's execution and outputs a camera driving request signal to the processor 120. The processor 120 outputs a capturing start signal to the camera 130 in response to the camera driving request signal of the application 110. The camera 130 starts capturing the activity surface (AS) in response to the capturing start signal of the processor 120, and transmits an Ack signal to the application 110. The camera 130 generates the activity surface video (ASV) obtained by capturing the activity surface (AS), and transmits the activity surface video (ASV) to the display 140 in real time. The display 140 outputs the activity surface video (ASV) received from the camera 130 in real time.

The application 110 transmits a guide output signal to the processor 120 in response to the Ack signal from the camera 130 to shoot a cover of the book object (BO) which is the target of the reading support service. The processor 120 transmits a cover capturing guide output signal to the display 140 in response to the Ack signal of the camera 130 and a cover guide output signal of the application 110. The display 140 outputs a cover capturing guide (CCG) so as to overlap (overwrite) the activity surface video (ASV) in response to the guide output signal.

Referring to FIG. 8, the display 140 overlaps (overwrites) the cover capturing guide (CCG) including a horizontal line (HL) and a vertical line (VL) connecting the center point of a screen, and a cover recognition surface with the activity surface video (ASV) to output the result.

Referring to FIG. 9, when the user disposes the book object (BO) so that the book object (BO) is located on the cover recognition surface output by the display 140, the camera 130 shoots a surface where the book object (BO) is disposed, and the display 140 outputs the activity surface video (ASV) shot by the camera 130.

The video processing engine 150 performs video recognition for the surface corresponding to the cover recognition surface of the cover capturing guide (CCG) in the entire surface of the activity surface video (ASV). The video processing engine 150 generates a cover image as a result of video recognition, and the memory 180 temporarily stores the cover image generated by the video processing engine 150.

The processor 120 generates a book identification request signal including the cover image stored in the memory 180 to transmit the book identification request signal to the first communication module 160. The first communication module 160 transmits the received book identification request signal to the service server 200 through the network.

The first communication module 160 receives a book identification response corresponding to the book identification request signal. The first communication module 160 receives a book identification response including book information corresponding to the book object (BO) from the service server 200. At this time, the first communication module 160 receives book information including the book name and the interactive object information from the service server 200, and as an example, the interactive object information includes an interactive object image (IOI) of the interactive object (IO) used for supporting the reading for the book.

If the cover image is not the cover of the book object (BO) or is not the book object (BO) registered in the service server 200, the first communication module 160 may also receive a book identification response including a book recognition error message. The first communication module 160 transmits the book identification response received from the service server 200 to the processor 120.

If the book recognition error message is included in the book identification response, the processor 120 transmits a guide output signal to the display 140. The display 140 outputs the cover capturing guide (CCG) so as to overlap (overwrite) the activity surface video (ASV) in response to the guide output signal. At this time, the display 140 may also output a guide to replace the book object (BO), a guide to move the location, and the like together with the cover capturing guide (CCG).

When book information is included in the book identification response, the processor 120 transmits a book information output signal to the display 140. The display 140 outputs a service start confirmation object of the book object (BO) so as to overlap (overwrite) the activity surface video (ASV) together with the book information in response to the book information output signal.

When the user selects the service start confirmation object among service start confirmation objects displayed on the reading support apparatus 100, the application 110 transmits a reading support service start confirmation object to the processor 120.

The processor 120 detects the book information from the book identification response in response to the reading support service start confirmation object. The processor 120 generates a reading support information signal including the detected book information to transmit the reading support information signal to the first communication module 160. The first communication module 160 transmits the received reading support information signal to the service server 200 through the network.

The first communication module 160 receives reading support information corresponding to the reading support information signal. At this time, the first communication module 160 receives the reading support information including a page image for page recognition of the book object (BO), an interactive object image (IOI) related to the page of the book object (BO), an additional video matched with the page or the interactive object image (IOI) of the book object (BO), video change information, and the like to transmit the reading support information to the processor 120.

The processor 120 stores the reading support information received through the first communication module 160 in the storage 170. At this time, the storage 170 maintains the storage state of the reading support information corresponding to the book object (BO) until the reading support of the book object (BO) is completed.

Meanwhile, since the reading support information includes videos, images, and the like, it takes a certain time to receive (download) the reading support information from the service server 200. Accordingly, the processor 120 transmits the interactive object information output signal which requests the preparation of the interactive object (IO) included in the book information to the display 140.

As illustrated in FIG. 10, the display 140 outputs an interactive object preparation request screen including interactive object information included in the book information in response to the interactive object information output signal. At this time, the display 140 detects the interactive object image (IOI) from the book information included in the book identification response, and outputs an interactive object preparation request screen in which the detected interactive object image (IOI) is disposed according to a predetermined condition. Accordingly, the display 140 outputs the interactive object preparation request screen until the reading support information is completely received.

When the reading support information is completely received, the processor 120 detects the interactive contents (IC) based on the activity surface video (ASV) and the page image. That is, the processor 120 detects the page of the book object (BO) by comparing the activity surface video (ASV) shot by the camera 130 with the page image of the reading support information. The processor 120 transmits a page detection signal including the detected page to the storage 170.

The storage 170 detects a page image corresponding to the page included in the page detection signal in previously stored reading support information. The storage 170 detects the reading support information including the detected page image. Here, the page image may be information included in the page such as a specific object image, a page number, and a text included in the page as well as the image obtained by capturing the page.

The storage 170 transmits the detected reading support information to the processor 120, and the processor 120 detects the additional video included in the received reading support information as the interactive contents (IC). The processor 120 transmits the interactive contents output signal including the detected interactive contents (IC) to the display 140.

As illustrated in FIG. 11, the display 140 outputs the interactive contents (IC) so as to overlap (overwrite) the activity surface video (ASV) in response to the interactive contents output signal of the processor 120. At this time, the display 140 may output the interactive contents (IC) on the entire screen, or output the interactive contents (IC) on a portion of the screen on which the activity surface video (ASV) is output.

Meanwhile, if the interactive object image (IOI) is included in the detected reading support information, the processor 120 detects the interactive object image (IOI). The processor 120 transmits the interactive object output signal including the detected interactive object image (IOI) to the display 140.

As illustrated in FIG. 12, the display 140 outputs the interactive object image (IOI) so as to overlap (overwrite) the activity surface video (ASV) in response to the interactive object image output signal of the processor 120. That is, the display 140 outputs the activity surface video (ASV) shot by the camera 130 in real time, and outputs the interactive object image (IOI) included in the interactive object image output signal so as to overlap (overwrite) the activity surface video (ASV). At this time, the display 140 outputs the interactive object image (IOI) by adding a video effect such as flashing.

The user watches the interactive object image (IOI) output to the display 140 and then disposes the interactive object (IO) corresponding to the interactive object image (IOI) at the upper portion of the book object (BO). Accordingly, the activity surface video (ASV) in which the interactive object (IO) is disposed on the book object (BO) is output to the display 140.

The video processing engine 150 detects the interactive object (IO) from the activity surface video (ASV). That is, the video processing engine 150 detects the type of the interactive object, the location of the interactive object, and the like from the activity surface video (ASV), and generates the interactive object detection information including them to transmit the generated information to the processor 120. Here, the location of the interactive object means a location in which the interactive object (IO) is detected from the activity surface video (ASV), and a location on the surface where the activity surface video (ASV) is output.

The processor 120 generates a reading support information detection signal including the activity surface video (ASV) and the interactive object detection information. At this time, the processor 120 generates the reading support information detection signal including the activity surface video (ASV) shot by the camera 130 and the interactive object type (shape) to transmit the reading support information detection signal to the storage 170.

The storage 170 primarily detects the reading support information including the page image corresponding to the activity surface video (ASV) of the interactive contents (IC) in the previously stored reading support information. The storage 170 secondarily detects the reading support information corresponding to the type of the interactive object of the interactive contents (IC) in the primarily detected reading support information. The storage 170 transmits the secondarily detected reading support information to the processor 120.

The processor 120 detects video deformation information from the reading support information. The processor 120 transmits a video deformation request signal including the video deformation information and the location of the interactive object to the video processing engine 150. At this time, as an example, the processor 120 detects the video deformation information, which is graphic conversion information such as blur, distortion, and brightness level for deforming a partial surface of the interactive contents (IC).

The video processing engine 150 generates a deformation video by deforming a portion of the interactive contents (IC) in response to the video deformation request signal.

The video processing engine 150 detects the location of the interactive object from the video deformation request signal. The video processing engine 150 detects a partial surface of the entire surface of the interactive contents (IC) as a deformation target area (DTA) based on the detected location of the interactive object. At this time, the video processing engine 150 centers on the location of the interactive object of the interactive contents (IC), and detects a surface with a set area as the deformation target area (DTA). That is, the deformation target area (DTA) is an area expanding outward from the interactive object based on the outline of the interactive object or a partial surface of the interactive object.

The video processing engine 150 detects the video deformation information from the video deformation request signal. The video processing engine 150 generates the deformation video by deforming the deformation target area (DTA) of the interactive contents (IC) based on the video deformation information.

When the deformation video is generated by the video processing engine 150, the processor 120 transmits a deformation video output request signal to the display 140.

As illustrated in FIG. 13, the display 140 replaces and outputs the interactive contents (IC) with the deformation video in response to the deformation video output request signal of the processor 120.

The video processing engine 150 detects the location of the interactive object from the activity surface video (ASV) to transmit the location of the interactive object to the processor 120 even after the interactive contents (IC) are output.

The processor 120 determines whether the interactive object (IO) is moved by comparing the location of the interactive object detected by the video processing engine 150 with the just before detected location of the interactive object. At this time, the processor 120 determines that the interactive object (IO) is moved if the detected location of the interactive object is different from the just before detected location of the interactive object.

When it is determined that the interactive object (10) is moved, the processor 120 transmits a location movement signal including the location of the interactive object to the video processing engine 150.

The video processing engine 150 changes the deformation target area (DTA) based on the location of the interactive object changed in response to the location movement signal. The video processing engine 150 deforms the deformation target area (DTA) based on the video deformation information to regenerate the deformation video reflecting the changed location of the interactive object.

When the deformation video is regenerated by the video processing engine 150, the processor 120 transmits the deformation video output request signal to the display 140.

Accordingly, as illustrated in FIG. 14, the display 140 outputs a deformation video reflecting the changed location of the interactive object.

As an example, referring to FIG. 15, when the interactive object (IO) has a black hole shape and the interactive contents (IC) in which a doctor and an alien interact with each other are output to the display 140, the video processing engine 150 detects the location of the interactive object from the video deformation request signal of the processor 120. The video processing engine 150 centers on a circular black hole located inside the black hole-shaped interactive object (IO), and sets the deformation target area (DTA) expanding outward from the black hole. At this time, the video processing engine 150 sets the deformation target area (DTA) including the head portion of the doctor.

The video processing engine 150 detects the video deformation information from the video deformation request signal. At this time, since the interactive object (IO) has the black hole shape, the video processing engine 150 detects distortion information which is video distortion information in which the doctor disposed in the deformation target area (DTA) of the interactive contents (IC) deforms the area into a shape sucked into the black hole.

The video processing engine 150 generates the deformation video deformed into the shape in which the doctor's head located in the deformation target area (DTA) of the interactive contents (IC) is sucked into the black hole based on the distortion information which is the video deformation information.

When the deformation video is generated by the video processing engine 150, the processor 120 transmits the deformation video output request signal including the deformation video to the display 140. Accordingly, the display 140 outputs the deformation video in which the doctor's head is sucked into the black hole among the interactive contents (IC).

As another example, referring to FIG. 16, if the interactive object (IO) has a flashlight shape and the interactive contents (IC) of a deep sea video are output to the display 140, the video processing engine 150 detects the location of the interactive object from the video deformation request signal of the processor 120. The video processing engine 150 centers on a lamp of the flashlight-shaped interactive object (IO), and sets the deformation target area (DTA) expanding outward from the lamp. At this time, the video processing engine 150 sets the deformation target area (DTA) including a deep sea fish of deep sea videos.

The video processing engine 150 detects the video deformation information from the video deformation request signal. At this time, since the interactive object (IO) has the flashlight shape, the video processing engine 150 detects brightness information, which is the video deformation information increasing the brightness of the deformation target area (DTA) of the interactive contents (IC).

The video processing engine 150 increases the brightness of the deformation target area (DTA) of the interactive contents (IC) based on the brightness information, which is the video deformation information, to generate the deformation video showing the deep sea fish located in the deformation target area (DTA).

When the deformation video is generated by the video processing engine 150, the processor 120 transmits the deformation video output request signal including the deformation video to the display 140. Accordingly, the display 140 outputs the deformation video showing the deep sea fish of the deep sea videos.

The service server 200 is composed of a server which provides the reading support service. The service server 200 detects book information, interactive object information, interactive contents (IC), and the like from the database 300 according to the signal of the reading support apparatus 100, and transmits the detected information 100 to the reading support apparatus 100.

Referring to FIG. 17, the service server 200 is configured to include a second communication module 210 which communicates with the reading support apparatus 100, a book identification engine 220 which detects a book identifier from the database 300 in response to a book identifier detection request of the reading support apparatus 100, a book information detection engine 230 which detects book information from the database 300 based on the book identifier, a reading support information detection engine 240 which detects reading support information based on the book identification information, and a control engine 250 which controls the second communication module 210, the book identification engine 220, the book information detection engine 230, and the reading support information detection engine 240 to provide the reading support service. Here, the control engine 250, the book identification engine 220, the book information detection engine 230, and the reading support information detection engine 240 may also be composed as one processor 120 to operate.

Referring to FIG. 18, the second communication module 210 receives a book identification request signal from the reading support apparatus 100. The second communication module 210 receives the book identification request signal including the cover image of the book object (BO) to transmit the book identification request signal to the control engine 250.

The control engine 250 detects the cover image from the received book identification request signal. The control engine 250 generates a book identifier detection signal including the detected cover image to transmit the book identifier detection signal to the book identification engine 220.

The book identification engine 220 detects a book identifier from the cover image in response to the book identifier detection signal. That is, the book identification engine 220 detects the cover image from the book identifier detection signal received from the control engine 250. The book identification engine 220 detects an object image included in the cover image through the video recognition for the detected cover image. The book identification engine 220 may also detect the object image composed of characters such as a book name, a publisher, and a book group name included in the cover image through an OCR.

The book identification engine 220 generates query data including the detected object image to transmit the query data to the database 300. Here, as an example, the object image includes one or more of the book name, the cover configuration image, the publisher, and the book group name included in the cover image.

The book identification engine 220 receives a query response from the database 300 in response to the query data. At this time, the book identification engine 220 receives a query response including the book information including the book identifier. Here, as an example, the book identifier is a unique identifier assigned to each of the book objects (BO) provided by the reading support service.

The book identification engine 220 detects the book identifier from the query response received from the database 300, and transmits the detected book identifier to the control engine 250. The control engine 250 generates a book information detection request signal including the received book identifier to transmit the book information detection request signal to the book information detection engine 230.

The book information detection engine 230 detects the book information from the database 300 in response to the book information detection request signal from the control engine 250. The book information detection engine 230 detects the book identifier from the book information detection request signal. The book information detection engine 230 generates the query data including the detected book identifier to transmit the query data to the database 300.

Here, although it has been described with reference to FIG. 21 that the book information detection engine 230 generates the query data using the book identifier detected through the video recognition of the book identification engine 220, the book information detection engine 230 is not limited thereto and may also detect the book information by using the cover image as the query data. In this case, the book identification engine 220 may also be excluded from the configuration of the service server 200.

The book information detection engine 230 receives the query response in response to the query data from the database 300 to transmit the query response to the control engine 250. At this time, the book information detection engine 230 receives a query response including the book information including a book name and interactive object information. Here, as an example, the interactive object information includes the interactive object image (IOI) of the interactive object (IO) used for supporting the reading for the book.

The control engine 250 detects the book information from the query response received from the book information detection engine 230. At this time, the control engine 250 detects the book information including the book name and the interactive object information from the query response. The control engine 250 generates a book identification response including the detected book information, and transmits a book identification response signal including the book identification response to the second communication module 210.

The second communication module 210 detects the book identification response from the book identification response signal. The second communication module 210 transmits a book identification response to the reading support apparatus 100 which transmits the book identification request signal.

Meanwhile, if the cover image is not the cover of the book object (BO) or is not the book object (BO) registered in the service server 200, the book information detection engine 230 may have no query response to the query data, or receive the query response without the detection result. In this case, the control engine 250 generates the book identification response including a book recognition error message, and the second communication module 210 transmits the book identification response including the book recognition error message to the reading support apparatus 100 which transmits the book identification request signal.

Referring to FIG. 19, the second communication module 210 receives a reading support information signal from the reading support apparatus 100. The second communication module 210 receives the reading support information signal including the book information to transmit the reading support information signal to the control engine 250.

The control engine 250 detects the book information from the received reading support information signal. The control engine 250 generates the reading support information detection signal including the detected book information to transmit the reading support information detection signal to the reading support information detection engine 240.

The reading support information detection engine 240 detects interactive contents information from the database 300 in response to the reading support information detection signal of the control engine 250. The reading support information detection engine 240 detects the book information from the reading support information detection signal, and detects the book identifier from the detected book information. The reading support information detection engine 240 generates query data including the detected book identifier to transmit the query data to the database 300. The reading support information detection engine 240 receives the query response in response to the query data from the database 300 to transmit the query response to the control engine 250.

At this time, the reading support information detection engine 240 receives the query response including the reading support information including the page image for page recognition of the book object (BO), the interactive object image (IOI) related to the page of the book object (BO), the additional video matched with the page of the book object (BO) or the interactive object image (IOI), and the like.

The control engine 250 detects the reading support information from the query response received from the reading support information detection engine 240. The control engine 250 generates a reading support information transmission signal including the detected reading support information to transmit the reading support information transmission signal to the second communication module 210.

The second communication module 210 detects reading support information from the reading support information transmission signal. The second communication module 210 transmits the reading support information to the reading support apparatus 100 which transmits the reading support information signal.

The database 300 is composed of a server which stores various information for providing the reading support service. The database 300 stores book information, interactive object information, interactive contents (IC), and the like, and detects information corresponding to the signal of the service server 200 to transmit the information to the service server 200.

Referring to FIG. 20, the database 300 is configured to include a query processing engine 310 which generates a query response including information detected from the storage 170 based on the query data received from the service server 200 to transmit the query response to the service server 200, a book identifier storage 320 which stores the book identifier related to the book object (BO), a book information storage 330 which stores the book information related to the book identifier, and a reading support information storage 340 which stores the reading support information related to the reading identifier.

The query processing engine 310 detects the book identifier from the book identifier storage 320 based on the query data, and generates a query response including the detected book identifier to transmit the query response to the service server 200.

The query processing engine 310 receives query data including the object image of the cover image. At this time, the query processing engine 310 receives the query data including the object image including one or more of a book name, a cover configuration image, a publisher, and a book group name included in the cover image.

The query processing engine 310 detects the object image from the query data. The query processing engine 310 detects a book identifier from the book identifier storage 320 based on the object image. The query processing engine 310 detects a book identifier related to the detected object image. The query processing engine 310 generates a query response including the detected book identifier to transmit the query response to the service server 200.

For example, referring to FIG. 21, the book identifier storage 320 stores the book identifier assigned to each book object (BO) capable of the reading support service, and the book identifier storage 320 stores a book name (a title image), a book group name (a group image), a publisher (a publisher image), and the like related to the book identifier.

Here, although it has been illustrated in and described with reference to FIG. 21 that the book identifier storage 320 stores the book name, the book group name, the publisher, and the like in the form of images, the book identifier storage 320 is not limited thereto and may store them in the form of text.

The query processing engine 310 detects "a0001" related to the same book name as the book identifier, when receiving query data including an object image corresponding to a book name "Title image #1".

The query processing engine 310 detects "a0002" related to the same book group name and publisher as the book identifier, when receiving query data including an object image corresponding to a book group name "Group image #1" and a publisher "B publisher image".

The query processing engine 310 may also receive query data including a cover image. The query processing engine 310 detects a book identifier related to the cover image of the query data from the book identifier storage 320. The query processing engine 310 generates a query response including the detected book identifier to transmit the query response to the service server 200.

The query processing engine 310 detects book information from the book information storage 330 based on the query data, and generates a query response including the detected book information to transmit the query response to the service server 200.

The query processing engine 310 receives the query data including the book identifier from the service server 200 (that is, the book information detection engine 230). The query processing engine 310 detects the book information related to the book identifier of the query data from the book information storage 330. At this time, the query processing engine 310 may receive the query data including the cover image from the service server 200, and also detect the book information related to the cover image from the book information storage 330. Here, as an example, the book information includes a book name and interactive object information (that is, an interactive object image (IOI)).

Referring to FIG. 22, the book information storage 330 stores a book identifier, a book name, and an interactive object image (IOI) to be related to each other.

The query processing engine 310 detects a book name "Title #2", an interactive object image (IOI) #1, an interactive object image (IOI) #2, and an interactive object image (IOI) #5 related to a book identifier "a0002", when receiving the query data including the book identifier "a0002".

The query processing engine 310 generates the book information including the detected book name "Title #2", interactive object image (IOI) #1, interactive object image (IOI) #2, and interactive object image (IOI) #5, and transmits the query response including them to the service server 200.

The query processing engine 310 detects reading support information from the reading support information storage 340 based on the query data, and generates a query response including the detected reading support information to transmit the query response to the service server 200.

The query processing engine 310 receives query data including the book identifier from the service server 200 (that is, the reading support information detection engine 240).

The query processing engine 310 detects the book identifier from the query data. The query processing engine 310 detects the reading support information from the reading support information storage 340 based on the book identifier.

Referring to FIG. 23, the reading support information storage 340 stores the book identifier, and stores the page image, the interactive object image (IOI), and the additional video related to the book identifier.

The page image is a reference image for recognizing the page of the book object (BO), and is stored in the reading support information storage 340 to be related to the book identifier and the page.

The interactive object image (IOI) is a reference image for recognizing the interactive object (IO) disposed on the book object (BO), and is stored in the reading support information storage 340 to be related to the book identifier and the page.

The additional video is Augmented Reality (AR) contents, Mixed Reality (MR) contents, eXtended Reality (XR) contents, or the like related to the interactive object (IO), and is stored in the reading support information storage 340 to be related to the book identifier, the page, and the interactive object image (IOI). At this time, the additional video may also be a video related only to the page of the book object (BO) without being related to the interactive object (IO), and is stored in the reading support information storage 340 to be related to the book identifier and the page. Here, the additional video may be actual video data, or a web address in which the actual video data is stored.

The query processing engine 310 detects all of the reading support information including at least one of the page, the page image, the interactive object image (IOI), and the additional video related to the book identifier "a0001", when receiving the query data including the book identifier "a0001". The query processing engine 310 transmits the detected reading support information to the service server 200.

Meanwhile, when there is no detection result corresponding to the query data of the service server 200, the query processing engine 310 transmits a query response including "NULL" to the service server 200.

Hereinafter, a reading support method by relating the book object (BO) to the interactive contents (IC) according to an exemplary embodiment of the present disclosure will be described with reference to the accompanying drawings as follows. FIGS. 24 to 26 are flowcharts illustrating a reading support method by relating the book object (BO) to the interactive contents (IC) according to an exemplary embodiment of the present disclosure.

First, the reading support apparatus 100 is in a state of being connected to a network. The user drives the application 110 installed in the reading support apparatus 100 to use the reading support service. That is, after driving the reading support apparatus 100, the user executes the application 110 supporting the reading support service through an operation such as touch, click, or double click.

The application 110 activated by the user outputs the camera driving request signal to the processor 120 (S111), and the processor 120 outputs the capturing start signal to the camera 130 and the display 140 in response to the camera driving request signal (S112).

The camera 130 starts capturing the activity surface (AS) in response to the capturing start signal (S113). At this time, when the normal capturing of the activity surface (AS) starts, the camera 130 outputs the Ack signal for the capturing start signal to the application 110 and the processor 120.

The display 140 outputs the activity surface video (ASV) shot by the camera 130 in real time in response to the capturing start signal (S114).

The application 110 receiving the Ack signal from the camera 130 outputs the guide output signal for capturing the cover of the book object (BO) to the processor 120 (S115).

The processor 120 which receives the Ack signal of the camera 130 and the guide output signal of the application 110 outputs the cover capturing guide output signal to the display 140 (S116).

The display 140 which receives the cover guide output signal of the processor 120 outputs the cover capturing guide (CCG) in response to the cover guide output signal (S117). At this time, the display 140 outputs the cover capturing guide (CCG) so as to overlap (overwrite) the activity surface video (ASV) being output.

The user disposes the book object (BO) on the activity surface (AS) so that the cover of the book object (BO) is shot. When the book object (BO) is disposed on the activity surface (AS), the activity surface video (ASV) obtained by capturing the activity surface (AS) on which the book object (BO) is disposed is output to the display 140. At this time, the activity surface video (ASV) including the cover of the book object (BO) is output to the display 140.

When the activity surface video (ASV) including the cover of the book object (BO) is output (S118; Yes), the video processing engine 150 generates the cover image through the video recognition for the activity surface video (ASV) (S119). That is, the video processing engine 150 performs the video recognition for the surface corresponding to the cover recognition surface of the cover capturing guide (CCG) of the entire surface of the activity surface video (ASV). The video processing engine 150 generates the cover image as a result of the video recognition and temporarily stores the cover image in the memory 180.

The processor 120 generates the book identification request signal including the cover image (S120). That is, the processor 120 detects the cover image stored in the memory 180, and generates the book identification request signal including the detected cover image. The processor 120 transmits the book identification request signal to the first communication module 160 through the bus.

The first communication module 160 transmits the book identification request signal generated by the processor 120 to the service server 200 through the network, and receives the book identification response in response to the book identification request signal (S121). At this time, the first communication module 160 may receive the book identification response including one of the book information and the book recognition error message.

The book information includes the book information including the book name and the interactive object information, and the interactive object information may include the interactive object image (IOI) of the interactive object (IO) used for supporting the reading for the book.

The book recognition error message is a message which conveys that the cover image included in the book identification request signal is not the cover of the book object (BO), or is not the book object (BO) registered in the service server 200.

If the book recognition error message is included in the book recognition response received from the first communication module 160 (S122; No), the reading support apparatus 100 performs the aforementioned S117 to S121 again. At this time, the display 140 may output the guide to replace the book object (BO), the guide to move the location, or the like together with the cover capturing guide (CCG).

If the book information is included in the book identification response received from the first communication module 160 (S122; Yes), the processor 120 transmits the book information output signal to the display 140 (S123). That is, the processor 120 detects the book information including the book name and the interactive object information from the book identification response, and generates the book information output signal including the detected book information. The processor 120 transmits the generated book information output signal to the display 140.

The display 140 outputs the book information and the service start confirmation object of the book object (BO) in response to the book information output signal of the processor 120 (S124). At this time, the display 140 may also output the book information and the service start confirmation object by overlapping (overwriting) the activity surface video (ASV).

When the service start confirmation object is selected by the user (S125; Yes), the application 110 transmits the reading support service start signal to the processor 120 (S126).

The processor 120 detects the book information from the book identification response in response to the reading support service start signal, and generates the reading support information signal including the detected book information (S127). The processor 120 transmits the generated reading support information signal to the first communication module 160.

The first communication module 160 transmits the reading support information signal generated by the processor 120 to the service server 200 through the network, and receives the reading support information in response to the reading support information signal (S128). At this time, as an example, the reading support information includes the page image for the page recognition of the book object (BO), the interactive object image (IOI) related to the page of the book object (BO), the addition video matched with the page of the book object (BO) or the interactive object image (IOI), and the like. The first communication module 160 transmits the received reading support information to the processor 120.

The processor 120 stores the reading support information received through the first communication module 160 in the storage 170 (S129). At this time, the storage 170 maintains the storage state of the reading support information corresponding to the book object (BO) until the reading support of the book object (BO) is completed.

Since the reading support information includes videos, images, and the like, it takes the certain time to receive (download) the reading support information from the service server 200. Accordingly, the processor 120 outputs the interactive object information output signal which signals the preparation of the interactive object (IO) included in the book information to the display 140 (S130).

The display 140 outputs the interactive object preparation request screen including the interactive object information included in the book information in response to the interactive object information output signal (S131). At this time, the display 140 detects the interactive object image (IOI) from the book information included in the book identification response, and outputs the interactive object preparation request screen in which the detected interactive object image (IOI) is disposed according to the predetermined condition. Accordingly, the display 140 outputs the interactive object preparation request screen until the reading support information is completely received.

When the reading support information is completely received (S132; Yes), the processor 120 detects the page of the book object (BO) by comparing the book contents (BC) of the activity surface video (ASV) shot by the camera 130 with the page image of the reading support information (S133). The processor 120 transmits the page detection signal including the page to the storage 170.

The storage 170 detects the page image corresponding to the page included in the page detection signal from the previously stored reading support information (S134), and detects the reading support information including the detected page image (S135). That is, the storage 170 detects the reading support information including the page image detected in the S134 from the previously stored reading support information. Here, the page image may be information included in the page such as a specific object image, a page number, and text included in the page as well as the image obtained by capturing the page. The storage 170 transmits the detected reading support information to the processor 120.

The processor 120 detects the additional video included in the received reading support information as the interactive contents (IC) (S136), and transmits the interactive contents output signal including the detected interactive contents (IC) 140 to the display 140 (S137).

The display 140 outputs the interactive contents (IC) of the interactive contents output signal by being overlapped (overwritten) with the activity surface video (ASV) including the book contents (BC) (S138).

A reading support method according to an exemplary embodiment of the present disclosure outputs the deformation video in which a partial surface of the interactive contents (IC) is deformed based on the location of the interactive object.

Referring to FIGS. 7 and 27, the processor 120 transmits the video deformation request signal including the location of the interactive object and the video deformation information to the video processing engine 150, and the video processing engine 150 detects the location of the interactive object from the video deformation request signal in response to the video deformation request signal (S210).

The video processing engine 150 detects a partial surface of the entire surface of the interactive contents (IC) as the deformation target area (DTA) based on the location of the interactive object (S220). At this time, the video processing engine 150 centers on the location of the interactive object of the interactive contents (IC), and detects an area having a set area as the deformation target area (DTA). That is, the deformation target area (DTA) is an area expanding outward from the interactive object (IO) based on the outline of the interactive object or the partial surface of the interactive object (IO).

The video processing engine 150 detects the video deformation information from the video deformation request signal (S230). The video processing engine 150 detects the video deformation information, which is graphic conversion information such as blur, distortion, and brightness level for deforming the partial surface of the interactive contents (IC).

The video processing engine 150 generates the deformation video in which the deformation target area (DTA) of the interactive contents (IC) is deformed based on the video deformation information (S240). At this time, the video processing engine 150 generates the deformation video in the deformation target area (DTA) through the deformation such as blur, distortion, and brightness adjustment for the partial surface of the interactive contents (IC).

The processor 120 transmits the deformation video output request signal to the display 140 in response to the generation of the deformation video by the video processing engine 150 (S250). At this time, the processor 120 transmits the deformation video output request signal including the deformation video generated by the video processing engine 150.

The display 140 detects the deformation video in response to the deformation video output request signal of the processor 120. The display 140 outputs the deformation video so as to overlap (overwrite) the activity surface video (S260). At this time, the display 140 replaces the interactive contents (IC) with the deformation video to output the deformation video.

Referring to FIG. 28, the video processing engine 150 detects the location of the interactive object from the activity surface video (ASV) even after the interactive contents (IC) are output (S310). The video processing engine 150 transmits the detected location of the interactive object to the processor 120.

The processor 120 determines whether the interactive object (IO) is moved by comparing the location of the interactive object detected by the video processing engine 150 with the just before detected location of the interactive object. At this time, the processor 120 determines that the interactive object (IO) is moved if the detected location of the interactive object is different from the just before detected location of the interactive object. When it is determined that the interactive object (IO) is moved (S320; Yes), the processor 120 transmits the location movement signal to the video processing engine 150 (S330). At this time, the processor 120 transmits the location movement signal including the location of the interactive object detected in the S310.

The video processing engine 150 resets the deformation target area (DTA) based on the changed location of the interactive object in response to the location movement signal (S340).

The video processing engine 150 regenerates the deformation video reflecting the video deformation information in the reset deformation target area (DTA) (S350).

When the deformation video is regenerated by the video processing engine 150, the processor 120 transmits the deformation video output request signal to the display 140 (S360), and the display 140 outputs the regenerated deformation video (S370).

As described above, although the exemplary embodiments have been described by the limited exemplary embodiments and drawings, various deformations and changes may be made by those of ordinary skill in the art from the above description. For example, even if the described technologies are performed in a different order than the described method, and/or the components of the described system, structure, device, circuit, and the like are coupled or combined in a different form, or replaced or substituted with other components or equivalents, appropriate results may be achieved.

Accordingly, other implementations, other exemplary embodiments, and equivalents to the claims also fall within the scope of the following claims.

What is claimed is:

1. A reading support system comprising:
 a reading support apparatus which is disposed on a physical surface having an activity surface on which an interactive object physically associated with reading material is disposed, the reading support apparatus comprising,
 a display;
 one or more processors; and
 one or more non-transitory computer-readable media storing instructions which, when executed, cause the one or more processors to perform operations, the operations comprising:
 a set of video operations comprising:
  receive an activity surface video depicting the activity surface and the interactive object and the reading material disposed on the activity surface,
  perform a video analysis for the activity surface video; and
  detect the interactive object and a location of the interactive object at a coordinate in the activity surface video as a result of the video analysis;
 detect interactive contents related to the activity surface video and the interactive object detected by the video analysis; and
  output an output signal comprising the interactive contents;
 cause the display to output the activity surface video and output the interactive contents to the activity surface video in response to the output signal so as to overlap at least a portion of the interactive object and the reading material in the activity surface video with the interactive contents;

wherein the operations further comprise output a video deformation request signal comprising the location of the interactive object and video deformation information after the interactive contents are output, and wherein the set video processing operations further comprise:

detect the location of the interactive object from the video deformation request signal in response to the video deformation request signal;

detect at least a portion of the interactive contents as a deformation target area based on the location of the interactive object;

detect the video deformation information from the video deformation request signal; and generate a deformation video reflecting the video deformation information in the deformation target area of the interactive contents, and wherein the operations further comprise:

output a deformation video output request signal comprising the deformation video generated by the set of video processing operations; and cause the display to replace the interactive contents being output with the deformation video to output the deformation video.

2. The reading support system of claim 1, wherein the operations further comprise output a location movement signal comprising the location of the interactive object when the location of the interactive object is moved, wherein the set of video processing operations further comprise:

reset the deformation target area in response to the location movement signal; and regenerate the deformation video reflecting the video deformation information in the reset deformation target area, and wherein the operations further comprise transmit the deformation video output request signal comprising the deformation video regenerated by the video processing engine to the display.

3. The reading support system of claim 2, wherein the operations further comprise determine that the interactive object is moved when the location of the interactive object detected by the set of video processing operations is different from a just before detected location of the interactive object.

4. The reading support system of claim 1, wherein the video processing operations further comprise:

center on the location of the interactive object of the interactive contents; and set an area having a set area as the deformation target area.

5. The reading support system of claim 1, wherein the video processing operations further comprise set an area expanding outward from the outline of the interactive object as the deformation target area.

6. The reading support system of claim 1, wherein the video processing operations further comprise set an area expanding outward from a partial surface of the interactive object as the deformation target area.

7. The reading support system of claim 1, wherein the video deformation information is graphic conversion information of one of blur, distortion, and brightness level.

8. The reading support system of claim 1, further comprising:

a camera which is configured to shoot the activity surface video comprising the activity surface of the physical surface and the one or more interactive objects disposed on the activity surface, and to output the activity surface video.

9. A reading support method comprising:

outputting, by a display, an activity surface video comprising an activity surface and one or more interactive objects physically associated with reading material disposed on the activity surface;

performing, by a video processing engine, a video analysis for the activity surface video, and detecting the interactive object and a location of the interactive object at a coordinate in the activity surface video as a result of the video analysis;

detecting, by a processor, interactive contents related to the activity surface video and the interactive object;

outputting, by the processor, an output signal comprising the interactive contents;

outputting, by the display, the interactive contents in response to the output signal to output the interactive contents so as to overlap at least a portion of the interactive object and the reading material in the activity surface video;

outputting, by the processor, a video deformation request signal comprising the location of the interactive object and video deformation information after the outputting of the interactive contents;

detecting, by the video processing engine, the location of the interactive object from the video deformation request signal in response to the video deformation request signal, and setting at least a portion of the interactive contents as a deformation target area based on the location of the interactive object;

detecting, by the video processing engine, video deformation information from the video deformation request signal in response to the video deformation request signal, and generating a deformation video reflecting the video deformation information in the deformation target area of the interactive contents;

outputting, by the processor, a deformation video output request signal comprising the deformation video generated in the generating of the deformation video; and replacing, by the display, the interactive contents being output with the deformation video in response to the deformation video output request signal to output the deformation video.

10. The reading support method of claim 9, further comprising:

outputting, by the processor, a location movement signal comprising the location of the interactive object when the location of the interactive object is moved;

resetting, by the video processing engine, the deformation target area in response to the location movement signal;

regenerating, by the video processing engine, the deformation video reflecting the video deformation information in the deformation target area reset in the resetting; and outputting, by the processor, a deformation video output request signal comprising the deformation video regenerated by the video processing engine.

11. The reading support method of claim 10, wherein the outputting of the location movement signal outputs the location movement signal by determining that the interactive object is moved when the location of the interactive object is different from a just before detected location of the interactive object.

12. The reading support method of claim 10, wherein the setting of at least the portion of the interactive contents as the deformation target area centers on the location of the interactive object of the interactive contents, and sets an area having a set area as the deformation target area.

13. The reading support method of claim 10, wherein the setting of at least the portion of the interactive contents as the deformation target area sets an area expanding outward from the outline of the interactive object as the deformation target area.

14. The reading support method of claim 10, wherein the setting of at least the portion of the interactive contents as the deformation target area sets an area expanding outward from a partial surface of the interactive object as the deformation target area.

15. The reading support method of claim 9, wherein the generating of the deformation video generates a deformation video reflecting video deformation information of one of blue, distortion, and brightness level in the deformation target area.

16. The reading support method of claim 9, further comprising:
capturing, by a camera, the activity surface video comprising the activity surface and one or more interactive objects disposed on the activity surface.

* * * * *